United States Patent
Chowdhury et al.

(10) Patent No.: US 7,974,650 B2
(45) Date of Patent: Jul. 5, 2011

(54) INTEROPERABILITY BETWEEN DIFFERENT TYPES OF WIRELESS NETWORKS FOR PUSH TO TALK GROUP CALLS

(75) Inventors: Sharmin Chowdhury, Naperville, IL (US); Thomas P. Chu, Englishtown, NJ (US); Bryan Kadel, Carol Stream, IL (US); Ping Z. Perzentka, Naperville, IL (US); Charles Salisbury, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1084 days.

(21) Appl. No.: 11/708,297

(22) Filed: Feb. 20, 2007

(65) Prior Publication Data
US 2008/0200162 A1      Aug. 21, 2008

(51) Int. Cl.
*H04B 7/00* (2006.01)
*H04Q 7/20* (2006.01)

(52) U.S. Cl. .................. 455/518; 455/422.1; 455/432.2; 455/519

(58) Field of Classification Search ............... 455/422.1, 455/517, 518, 519, 520, 509, 414.4, 432.2, 455/515, 446; 370/312, 328
See application file for complete search history.

(56) References Cited

U.S. PATENT DOCUMENTS

| | | | | |
|---|---|---|---|---|
| 6,477,150 | B1 * | 11/2002 | Maggenti et al. | 370/312 |
| 2006/0105792 | A1 * | 5/2006 | Armbruster et al. | 455/517 |
| 2009/0252084 | A1 * | 10/2009 | Fodor et al. | 370/328 |
| 2009/0280754 | A1 * | 11/2009 | Lasensky et al. | 455/90.2 |

* cited by examiner

*Primary Examiner* — John Lee
(74) *Attorney, Agent, or Firm* — Carmen Patti Law Group, LLC

(57) ABSTRACT

An exemplary gateway apparatus provides push-to-talk (PTT) communications between users in one network with users in another network where the networks utilize different communication protocols. It includes two protocol modules that interface with the two networks, respectively. The protocol modules are capable of receiving and transmitting messages compatible with the communication protocols used by the associated networks. An interoperability module, connected between the two modules, converts PTT control messages received from one of the networks into PTT control messages compatible with and transmitted to the other network. The PTT control messages received from the one network have a protocol that differs from the protocol of the PTT control messages transmitted to the other network.

14 Claims, 18 Drawing Sheets

INTEROPERABILITY BETWEEN DIFFERENT TYPES OF WIRELESS NETWORKS FOR PUSH TO TALK GROUP CALLS

BACKGROUND

This invention relates to wireless networks that support push-to-talk (PTT) group calls and more specifically to the ability to bridge support for such calls between two different types of wireless networks. For example, a PTT group call is supported among members of a group where some members of one group are in a public safety wireless network and other members of the same group are in a commercial wireless network.

PTT in Public Safety Wireless Networks

Wireless networks have been in use in the public safety sector, (police, fire fighters, emergency workers, etc.) for a long time. In the United States, the standard of public safety wireless network is the APCO (Association of Public Safety Communications Officials) Project 25 (P25) Systems whose specifications are the responsibility of the Telecommunications Industry Association (TIA), standard committee TR-8. The P25 standard is an international standard with system deployed in over 40 counties.

FIG. 1 shows an embodiment of a high level architecture of a P25 system. The local network may consist of a number of base stations 110 and 120, referred to as sites in P25 terminology. Subscriber wireless communication devices 101-104 are connected to the base stations through the air interface. The base stations are connected to a collection of controlling modules referred to collectively as the radio frequency subsystem (RFSS) 126. In P25, two relevant functional modules are the call control module 122 which handles call signaling, and the media control module 124 which deals with the forwarding and processing of media (e.g. voice) traffic. Attached to the RFSS are peripherals such as dispatch console 128, databases 130, data terminals 132, and gateways 134 to other networks such as the public switched telephone network (PSTN) 136. An Internet Protocol (IP) network 138 couples the RFSS 126 to other RFSS's.

Group Calls and Push to Talk

One application for a public safety wireless network is a group PTT call, i.e. a call in which one member of the group can speak to all other members simultaneously. For example, all police officers on patrol could constitute one group. In order to facilitate communications in an orderly manner, a floor control mechanism is needed to arbitrate who should speak in the event two and more members request to speak at the same time. As is known, a PTT user who wants to speak to the group will push a button on the person's handset. A message would then be sent to the RFSS which will arbitrate all the talk requests and either grant or deny each request by sending a response back to the requesters.

The Inter RF Sub-System Interface

The public safety sector has recognized the need of connecting different RFSS together to form a larger network with a much larger coverage. Based on this need, the TIA TR8 committee has developed such a standard, referred to as the Intra-RF Sub-Systems Interface (ISSI). This specification is based on the IP for the transport of information. The call signaling protocol is based on Session Invitation Protocol (SIP, RFC 3261), while the voice traffic and push-to-talk control messages are carried through the use of Real Time Protocol (RTP), RFC 3550). The ISSI specifies the connection between the RFSS's. The over the air interface protocol is specified by another suite of standards.

With the ISSI, a group can span multiple RFSS's. One RFSS would be designated the home RFSS which will manage all the activities of the group. The floor arbitrate function of the group also resides at the home RFSS. The non-home RFSS's are referred to as serving RFSS and are connected to the home RFSS through RTP. Members of a group do not need to at the home RFSS; they can roam to other RFSSs. When a user of the group requests the floor, i.e. permission to talk to the other group members, the serving RFSS will forward the request to the home RFSS using the ISSI protocol. The home RFSS will arbitrate any received requests and award the floor to a "winning" user. In addition to floor arbitration, the home RFSS also receives voice traffic from a serving RFSS and forwards it to other RFSSs. Specifically, the ISSI supports the following functions for group calls.

Group registration of a serving RFSS to a home RFSS: When a user at a serving RFSS indicates that it would like join a group, the serving RFSS will register the user with the home RFSS indicating that there are one or more users at its location joining the group. The SIP REGISTER message is used to accomplish this registration process.

Call control: Voice traffic as well PTT control messages are conveyed using RTP. ISSI specifies procedures to set up RTP connectivity between home RFSS and serving RFSSs. The SIP INVITE message is used to effect the RTP set up. In order to conserve network resources, after an extended period of inactivity, the home RFSS may tear down the RTP connections between it and the serving RFSSs. During this period, the serving RFSSs remain registered with the home RFSS. When the call becomes active again, the home RFSS or the serving can trigger call set up to re-establish the RTP connectivity again.

PTT-control: ISSI provides a set of control messages to support push-to-talk. These messages are encoded as part of the RTP messages.

Voice traffic: Voice traffic is also carried as part of the RTP payload. RTP connectivity must be established before PTT control messages and voice traffic can be sent between the home RFSS and the serving RFSSs.

PTT Control in ISSI

ISSI supports the following PTT control messages.

PTT-transmit-request: A message sent from a serving RFSS to the home RFSS requesting the floor on the behalf of a user.

PTT-transmit-grant: A message sent by the home RFSS to a serving RFSS granting a request from that serving RFSS PTT-transmit-deny: A message sent by the home RFSS to a serving RFSS denying a request from that serving RFSS PTT-transmit-start: A message sent by the home RFSS to all serving RFSS, except the serving RFSS that has been granted the floor, indicating that the floor has been grant to a user at another RFSS. These RFSS's should be prepared to receive traffic.

PTT-transmit-wait: A message sent by the home RFSS to a serving RFSS which has just requested the floor. This message indicates that the home RFSS is processing the request but the processing may take some time such as when enhanced functions are required.

PTT-transmit-mute (and PTT-transmit-unmute): These messages can be sent by all RFSS to mute (or unmute) a transmission temporary such as because of resource problems.

PTT-heartbeat and PTT-heart_query: These messages ascertain the RTP connectivity between RFSSs.

FIG. 2 is an illustration of a PTT call flow over ISSI. In FIG. 2, RFSS 200 is the home RFSS of a talk group. Connected to RFSS 200 are serving RFSS 210, 220, and 230. Users (SU)

212, 222, and 232 are connected to these RFSS's respectively. In this example, we assume that RTP connectivity between the home RFSS and the serving RFSS has already been set up. The sequence of events is as follows.

The users of SU 212 and SU 222 both want to speak to the floor. They press a button at the handset at about the same time. By pressing the button, the handset will generate a Group-voice-request (GRP_V_REQ) message to their respective serving RFSS (210 and 220) over the air interface. They are shown as message 1. and 1'.

Serving RFSS 210, upon receiving the GRP_V_REQ message from SU 212 will generate a PPT-transmit-request message to the home RFSS. The PTT message is one of the push-to-talk control message encoded as a RTP packet as specified in the ISSI specification. We assume that SU 212 is the only SU to request the floor at RFSS 210. If there are more that one SU at RFSS 210 requesting the floor, RFSS 210 will determine a local winner, based on the priority of the request as well as the local policy. The PTT-transmit-request message includes the identity of SU 212, the subscriber requesting the floor. Similar events take place at RFSS 220. The PTT-transmit-request messages are shown as message 2. and 2'.

The home RFSS, upon receipt of the two PTT-transmit-request messages, from RFSS 210 and 220, will decide who would win the floor. In this example, we will assume that SU 212 is the floor winner. Upon deciding that SU 222 is the floor winner, the home RFSS 200 will:

Send a PTT-transmit-deny message 3 to RFSS 210 informing it that its request for SU 212 has been denied.

Send a PTT-transmit-grant message 4 to RFSS 220 indicating that SU 222 has been awarded the floor.

Send to PTT-transmit-start message 6 to all RFSS except RFSS of the floor winner, RFSS 220.

Both the PTT-transmit-grant and PTT-transmit-start messages contain the identity of the floor winner. Both messages, upon arrival at the serving RFSS, will cause the generation of Group-voice-grant (GRP_V_GRANT) messages 7. and 7'. over the air to all members of the group connecting to the RFSS. Through these messages, other members of the group are informed that SU 102 is awarded the floor and that each should prepare to receive speech from it.

Losing Audio and Early Audio

When two users (UE1 and UE2) request the floor at the same time, only one of them (e.g., UE 1) will be granted the floor. However, this does not imply that the call from UE 2 is less important. Both calls may well be emergency calls. Most public safety networks support the concept of "losing audio". In the above example, UE1 is awarded the floor. Its audio stream, referred to as preferred audio, will be the audio stream that will be audio stream that will be broadcasted over the air to all subscribers. UE 2 is denied the floor but has the option to send its audio stream to the server anyway. The server will forward this audio to a pre-configured set of special stations such as recording machines and dispatch stations. In this way, audio from UE 2 can be listened to by these special stations. Most of the special stations are connected to the network via wire line links and usually have the ability to handle multiple inputs. Audio streams from users that are not the floor owner are referred to as "losing audios".

Another feature in public safety PTT applications is the concept of early audio. In early audio, a user is allowed to speak before his or her handset receives the floor grant from the server. Early audio can occur in a number of ways. First, some early legacy systems lack centralized PTT arbitration control. In these systems, users can just talk without requesting the floor first. Secondly, even in systems with centralized floor control, the floor request or the floor grant may be lost in the network. After some wait, the user is permitted to speak even without an explicit grant as it may be a critical call and should not incur more delay. Both losing audio and early audio are features supported by ISSI.

PTT in Commercial Wireless Networks

PTT has also generated a lot of interest in the commercial wireless networks. Applications are diverse ranging from a small group of friends in a conference PTT call determining where to meet for lunch, to communications for a fleet of cab drivers in a metro area. There are a number of proprietary solutions and standards being developed for such applications. One standard is the Push to Talk over Cellular (POC) standard from the Open Mobile Alliance (OMA). This standard is usually referred to as the OMA-PoC suite of standards.

In OMA-PoC, subscriber handsets (referred to as UEs) are connected to a server that supports the PTT function. This server usually referred to as the PoC controlling server (PTT server for short). In OMA-POC, SIP is used as the call signaling function to establish RTP connectivity between a UE and the POC server. Voice traffic is encoded as RTP packets. When establishing an RTP connection, an associate connection, known as Real time Control Protocol (RTCP) is also being simultaneous set up (i.e. RTP and RTCP are set up in pairs). One use of RTCP is to convey performance statistics from a receiver to the source of a media stream. Also, a user can use RTCP to carry other application data. OMA-POC uses RTCP as the method to convey PTT control packets. This protocol is referred to as the Talk Burst Control Protocol (TBCP). TBCP supports the following basic messages between the UE and the POC server:

TB-Idle: from the server to all the UEs indicating that the floor is idle.

TB-Request: from the UE to the sever requesting the floor

TB-Grant: from the server to a UE granting the UE's request for the floor.

TB-Deny: from the server to a UE denying the UE's request for the floor.

TB-Release: from the current speaking UE to the server indicating that it has finished.

TB-Taken: from the server to all other UEs indicating the floor has been granted to another UE.

TB-Revoke: from the server to the current floor owning UE indicating that the its floor ownership is revoked TB-Disconnect and TB-Connect: These messages are used to establish and to tear down TBCP connectivity.

TB-Request-queue-status-request and TB-Request-queue-status-request: These messages are used to support a queued system, which will be described later.

In the OMA-POC architecture, there is another component, referred to as the participating server. A number of UEs can be connected to a participating server which, in turn, is connected to the PoC control server. It provides more flexibility in call control configuration. As far as push-to-talk control (TBCP) and media traffic is concerned, a participating server just acts as pass through.

Queued and Non-Queued System

When a number of UEs (e.g., UE1, U2, and UE3) requesting the floor at the same time, the server would grant the floor to one of the requesting UE (e.g., UE1) the floor. In a queued system, the server will retain the requests from other UEs (e.g., UE2 and UE3) in its request queue. When the current floor owner (UE1) finishes and yields the floor, the server will then award the floor to a UE in its request queue (UE2, UE3, and other new arrivals). The TB-Request-queue-status-request message is used by an UE to request the status of its request in the request queue. In a non-queue system, the server would not retain a request queue. When a UE has made an unsuccessful floor request in a non-queue system, it has to send a new request again when the current floor owner yield the floor.

Contrast Between Networks

Commercial wireless networks have a much larger footprint than public safety wireless networks (PS-network). New public safety wireless networks are expensive to create. As commercial wireless network technologies begin to introduce PTT capability into their systems, it may be advantageous for public safety organization to consider deployment of commercial network technologies into their network as commercial wireless technologies tend to be cheaper based on economy of scale and progress in a rapid rate. However, there are problems to be overcome before a public safety organization can either deploy new services in a commercial wireless network or integrate an existing PS-network with a commercial wireless network. The current PS-networks must be interoperable with the commercial wireless technology. Further when interconnecting a PS-network with a commercial wireless network, all the needed public safety features, e.g. a PTT group call, must be supported in the commercial wireless network. Other notable features in public safety, e.g. emergency override and the support of "losing audio" and "early audio" should also preferably be supported in the commercial wireless network.

SUMMARY

It is an object of the present invention to satisfy some, if not all, of these needs by supporting the interconnection of one type of wireless network with another different type of network where at least certain features are supported for users in both networks.

An exemplary gateway apparatus provides PTT communications between users in one network with users in another network where the networks utilize different communication protocols. It includes two protocol modules that interface with the two networks, respectively. The protocol modules are capable of receiving and transmitting messages compatible with the communication protocols used by the associated networks. An interoperability module, connected between the two modules, converts PTT control messages received from one of the networks into PTT control messages compatible with and transmitted to the other network. The PTT control messages received from the one network have a protocol that differs from the protocol of the PTT control messages transmitted to the other network.

An exemplary method utilizes steps that provide the functionality general described for the gateway.

DESCRIPTION OF THE DRAWINGS

Features of exemplary implementations of the invention will become apparent from the description, the claims, and the accompanying drawings in which:

DETAILED DESCRIPTION

Commercial wireless networks and PS-wireless networks have different concerns and have evolved differently. For example:

Talk groups in PS-networks tend to stay up all the time, while those in commercial networks tend to be dynamically set up.

Talk groups in PS-networks have, in general, a large number of users and the group membership is relatively static. Talk groups in the commercial networks tend to be small but with dynamic group membership.

Call preemption is desired in PS applications while it is much less a concern in a commercial network.

The support of losing audio and early media is absent in commercial network.

As a result of these and other differences between the two networks, the architecture and protocol supporting PTT in the networks are quite different. In accord with an embodiment of the present invention, a gateway (GW) is used to interconnect the two networks. The gateway harmonizes the two different networks, i.e. provides interoperability with support of certain PS features. OMA-POC and ISSI are the emerging standards supporting PTT in pubic commercial wireless networks and PS networks, respectively. The illustrative gateway is described in the context of interconnecting an OMA PoC based commercial network and P25 PS-network.

Figure 1:
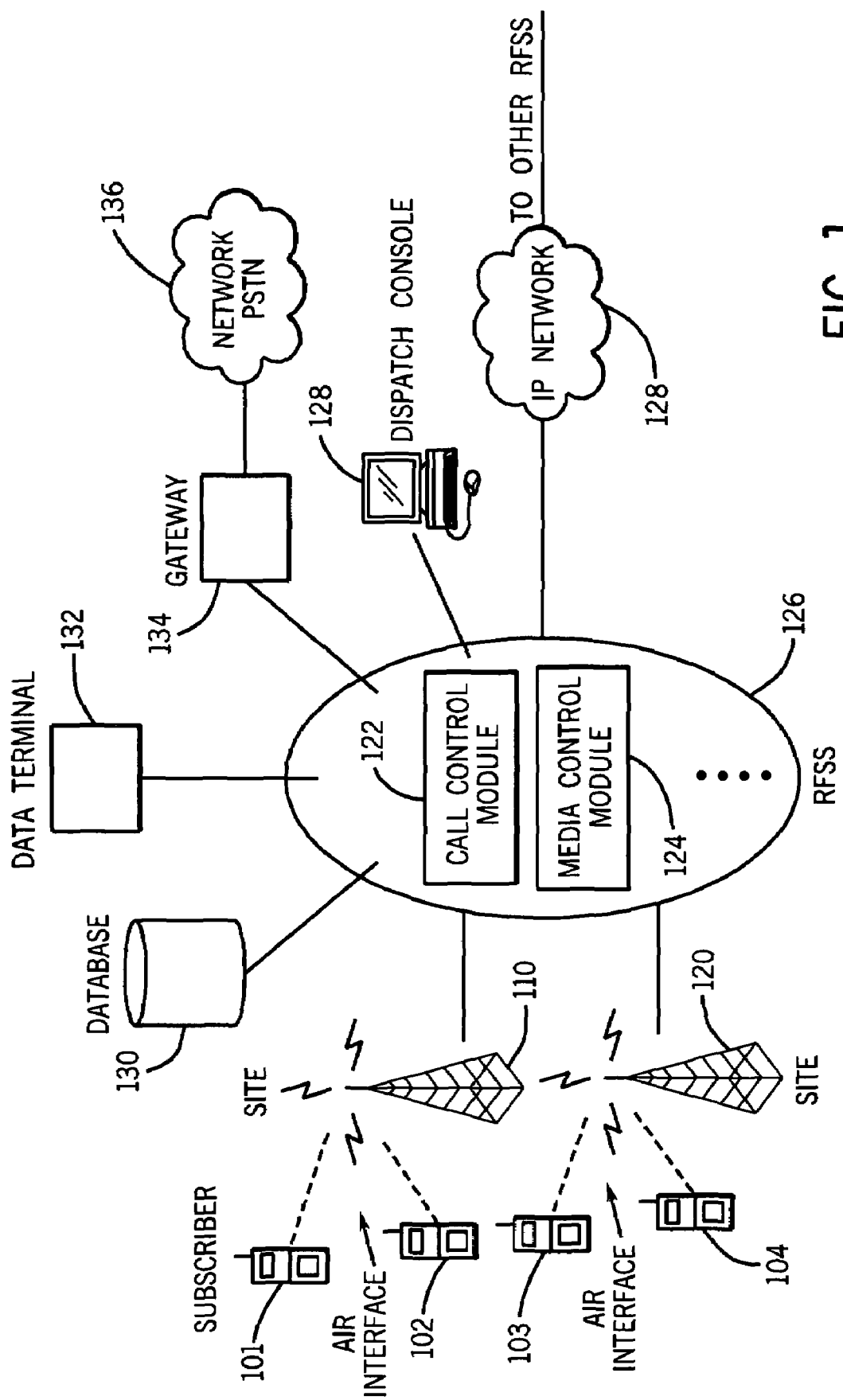
FIG. 1 is an illustration of a known P25 network system architecture.
Figure 2:
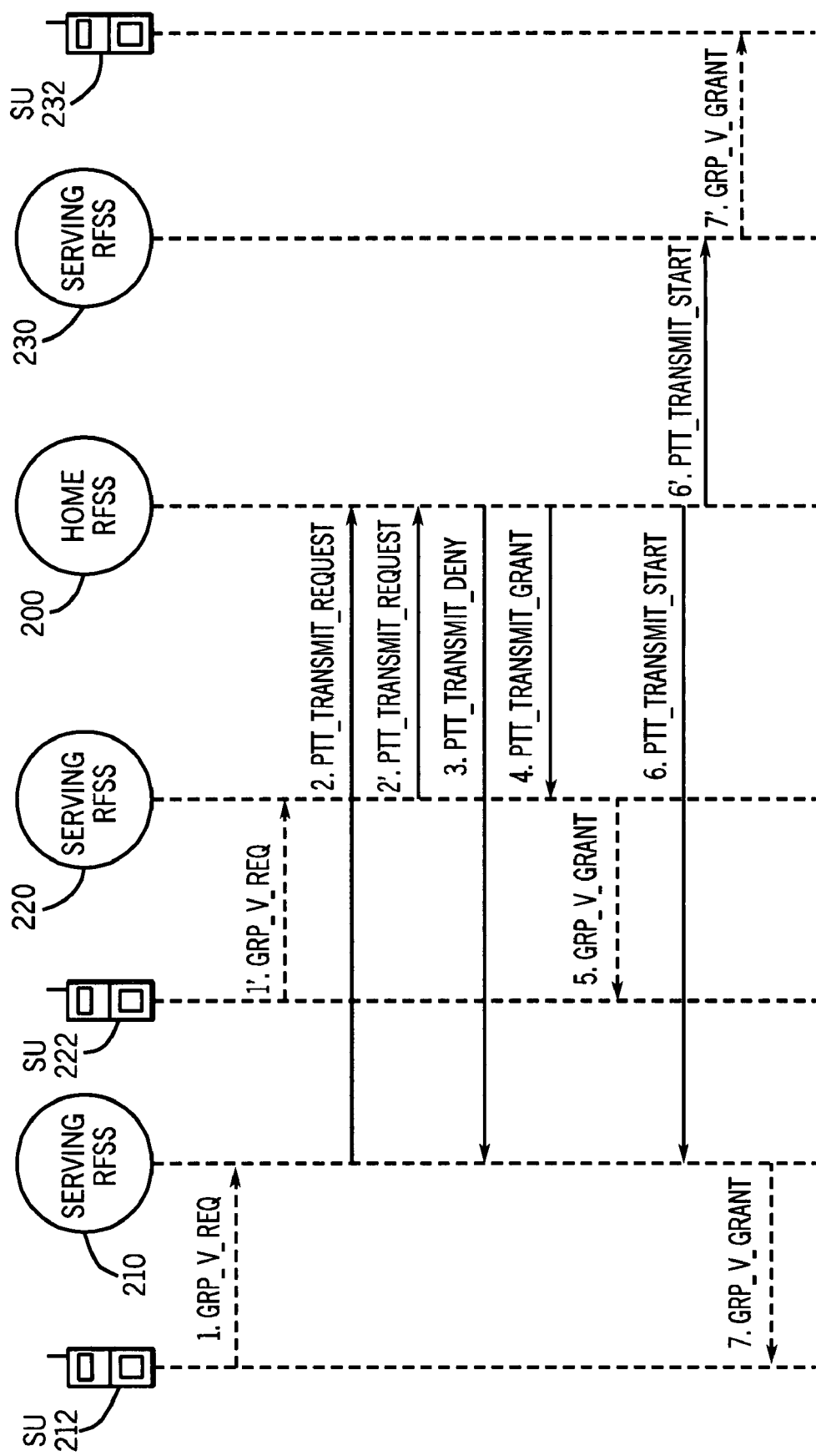
FIG. 2 presents an example of known PTT over the ISSI in P25.
Figure 3:
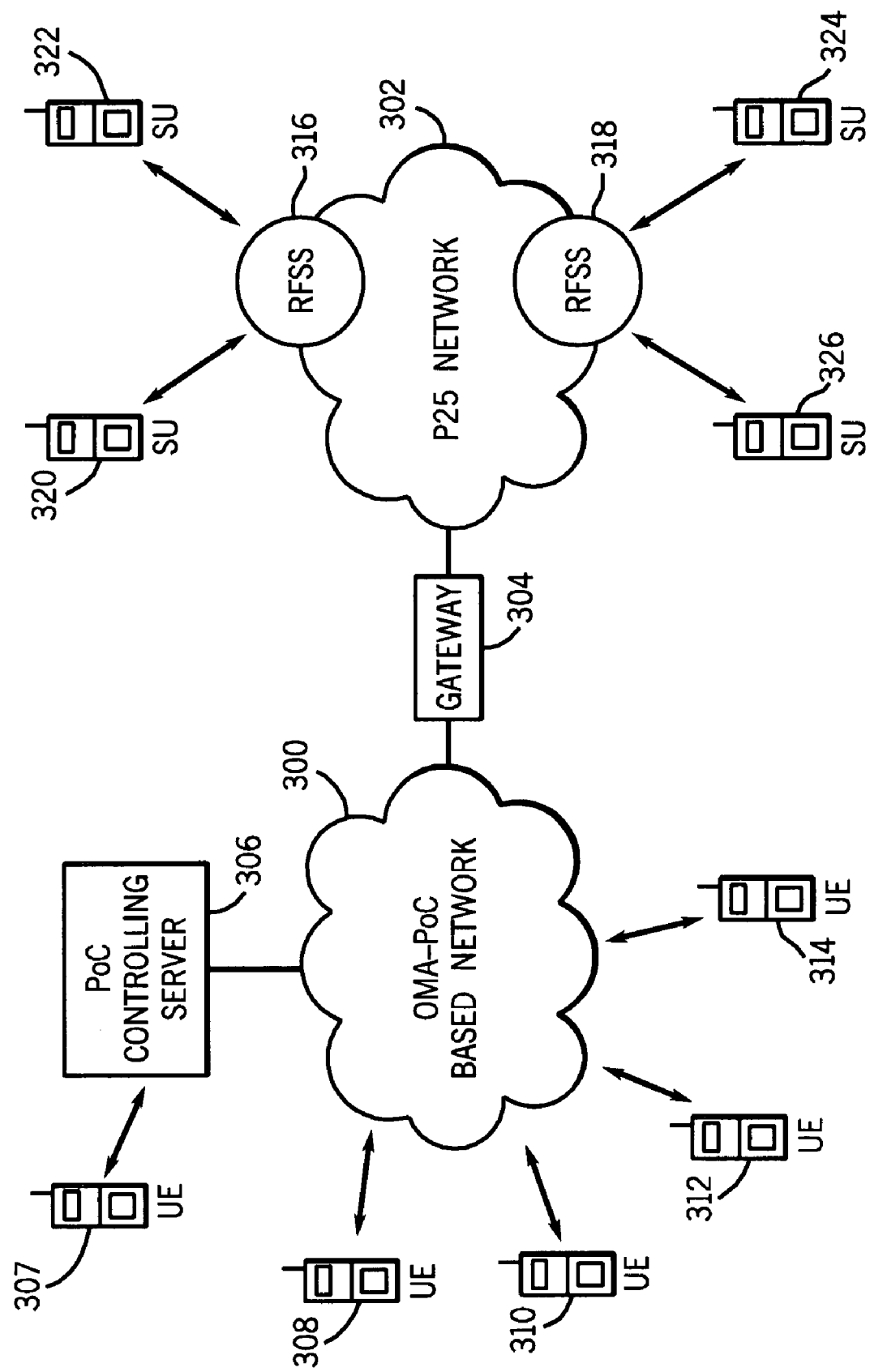
FIG. 3 shows an embodiment of an illustrative gateway in accordance with the present invention that interconnects a commercial wireless network with a PS-network.

In FIG. 3, OMA-PoC (commercial) network 300 is connected to P25 (PS) network 302 through gateway 304. The OMA-PoC network can be based on a wide variety of wireless network technologies as long as it provides IP service. Examples are UMTS, CDMA DO, Wi-fi, and Wi-Max networks. The OMA-PoC network will be referred to as the PoC network. The PoC network includes PoC controlling server 306 and UEs (users) 307, 308, 310, 312, and 314. The P25 network 302 includes 2 RFSS's 316 and 318 that support SU (users) 320, 322 and 324, 326, respectively.

Gateway (GW) 304 interconnects the commercial wireless network 300 and a public safety wireless network 302 to support group PTT that spans both networks, i.e. users UE 308 and SU 320 can be in the same talk group with group PTT communications supported for both.

Figure 4:
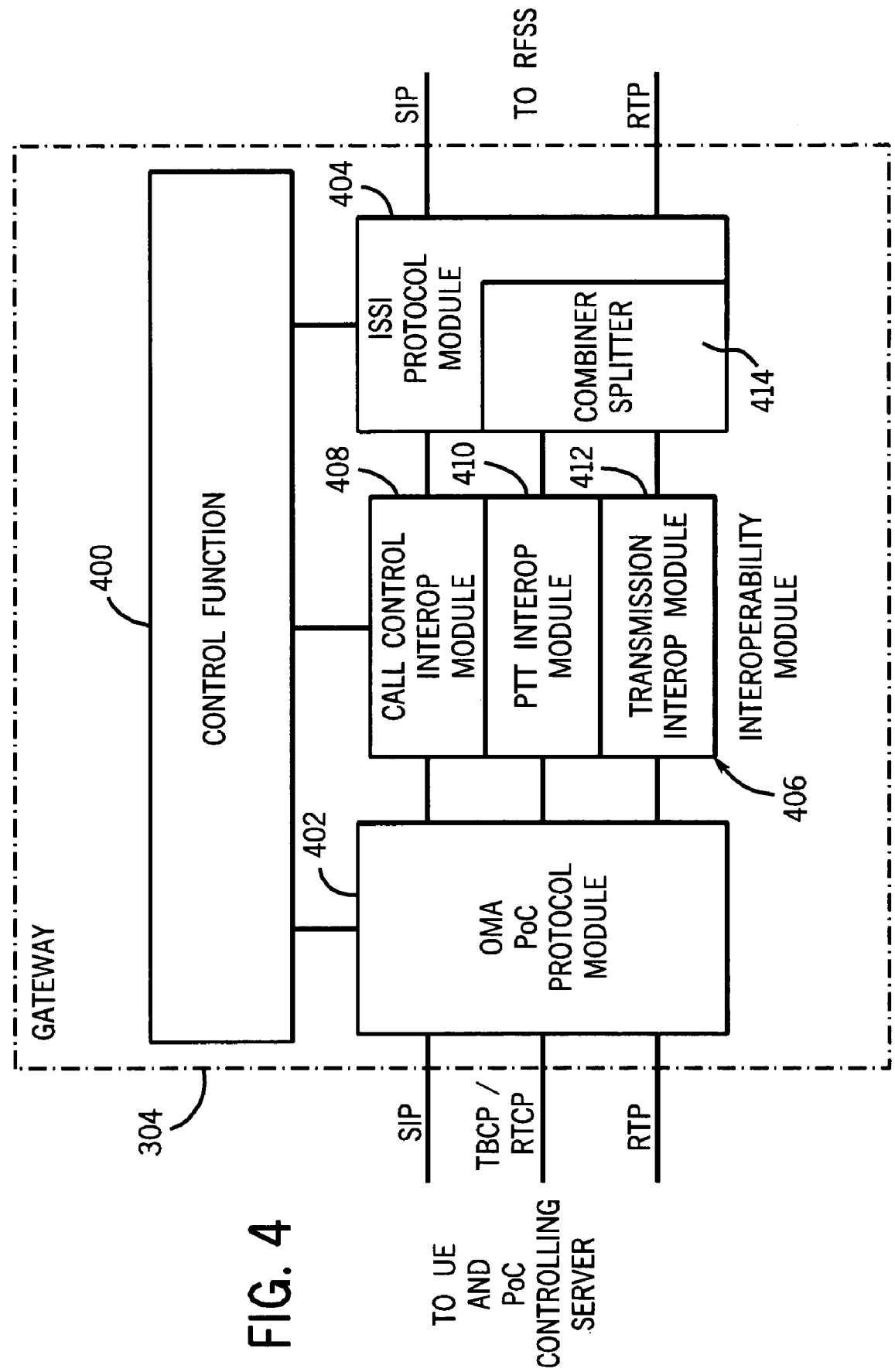
FIG. 4 shows an illustrative functional architecture of the gateway shown in FIG. 3.

Referring to FIG. 4, the illustrative GW 304 includes components: the OMA-PoC TBCP protocol module 402, the ISSI PTT control module 404, and the interoperability module 406. TBCP (talk burst control protocol) and ISSI (Inter RF Subsystems Interface) are the current PTT standards for commercial wireless network and public safety wireless networks respectively. The control function 400 provides integrated control of these three components.

In a group PTT call, there are three protocol layers:

Call control which is responsible for setting up RTP connectivity between components of the talk group such as subscriber units and the PTT servers.

PTT control which deals with the operation of the talk group such as floor control arbitration, call preemption, etc.

Media (or transmission) control which deals with the transfer of media packets, losing audio, early media, etc.

The interoperability module 406 is sub-divided into three modules corresponding to each of the three functions above: the call control module 408, the PTT control module 410, and the transmission control module 412. A number of known call control methods are possible, and this embodiment is compatible with various call control methods. Hence, the description of the embodiment focuses on interoperability for PTT control module 410 and transmission control module 412. For transmission interoperability, this embodiment uses an architecture and functional characteristics that will support both losing audio and early media features in public safety. The PTT interoperability module 410 keeps track of the local winner as determined by the OMA-PoC TBCP module and the global winner as informed by the home RFSS. This is explained in more detail below with regard to the state transition diagrams. The processing logic of the PTT interop module 410 can be implemented as a finite state machine and the associated state transitions.

The PTT interop module 410 coordinates all PTT activities between the two networks 300 and 302. The interop module 406 will trigger requests to the ISSI Protocol module 404 when the local winner has a higher priority than the global winner. The interop module will also filter any unnecessarily messages from both the OMA-POC protocol module 402 and the ISSI protocol module 404. In the illustrative embodiment, the PTT control protocols are assumed to be TBCP in the commercial network and ISSI in the PS-network. However, the embodiment could be used with networks using other PTT protocols by replacing the OMA Poc TBCP or ISSI protocol modules with the appropriate protocol interface module.

FIG. 4 shows the functional architecture of the GW 304 which includes OMA-PoC protocol module 402. This module allows the GW to function as a UE when connecting to PoC controlling server in the OMA-PoC network or to function as a PoC controlling server connected to UEs and/or a PoC participating server in the OMA-PoC network. The personality of the module depends on the configuration of the talk group, i.e. where the home control server is located. In PTT, there are three data streams: call signaling, PTT control, and audio traffic. As described previously, for OMA-PoC network, the protocol of these data streams are SIP, TBCP/RTCP, and RTP, respectively. Note that TBCP (PTT control) is conveyed through a different protocol than the audio stream (RTP).

The ISSI protocol module 404 allows the GW to be connected to different RFSSs of the P25 network. The GW can behave as a serving or home RFSS of a group depending on the configuration of the talk group. The call control signaling protocol for ISSI is SIP based. Both the PTT control packets and audio stream are multiplexed together in RTP packets. The ISSI protocol module 404 includes the combiner/splitter module 414 which combines the RTP traffic from transmission interop 412 and packets from PTT control 410 from the ISSI module into a single RTP stream to be transmitted by the ISSI protocol module. It also splits the RTP packets from the ISSI module and directs PTT control information to the PTT interop module 410 and the audio traffic to the transmission interop module 406. This splitter/combiner is used because PTT control information and audio information are multiplexed onto the same RTP packet in the ISSI.

Interoperability module 406 provides an interface between and harmonizes OMA-PoC with ISSI. It consists of submodules call control 408, PTT control 410 and transmission 412. In OMA-PoC, TBCP and the audio are separate data streams, while in ISSI the two are multiplexed into a single RTP stream. A further explanation of the operation of the interoperability module 406 is provided in the state diagrams described below. Control module 304 controls the functioning of all the three modules.

In many instances, RTP connectivity between entities in the PTT network (e.g. between two RFSS in P25) is set up persistently (i.e. as long as the group is up). Call set up is done once when one user registers with other. This improves the response of push-to-talk, as no further call signaling is needed after the initial call set up. In other instances, the RTP connectivity between two users may not be persistently set up. When a group call has been inactive for some time, the RTP connections between users would be torn down. When the call becomes active again, e.g. a member wants gain the floor and speak, the RTP connection will be set up again. This saves network resources, but the expense of response time. Both ISSI and OMA-PoC can support both modes on a connection-by-connection basis. Furthermore, although SIP is the RTP set up protocol for both ISSI and OMA-PoC, the SIP messages are encoded differently. Thus, translation of SIP messages is also required by the GW. RTP connection set up coordination (between the ISSI network and the OM-PoC network) as well as SIP message translation is the responsibility of the call control interop module 408.

The reason that PTT interoperability and transmission interoperability are linked is that, in ISSI, both types of information are contained in the same RTP packet. Thus, in the following detailed description of the invention, the implicitly assumption is that RTP connections are handled by the call control interop module and have already set up between all the entities involved.

Although a GW can support many talk groups, the embodiment focuses on individual groups, on a group-by-group basis, and thus connections are described for a single group. The home of the talk group can reside in the P25 network or the OMA-PoC network. As a special case, the GW can also be the home of the talk group.

Home of the Group Resides in the P25 Network

Figure 5:
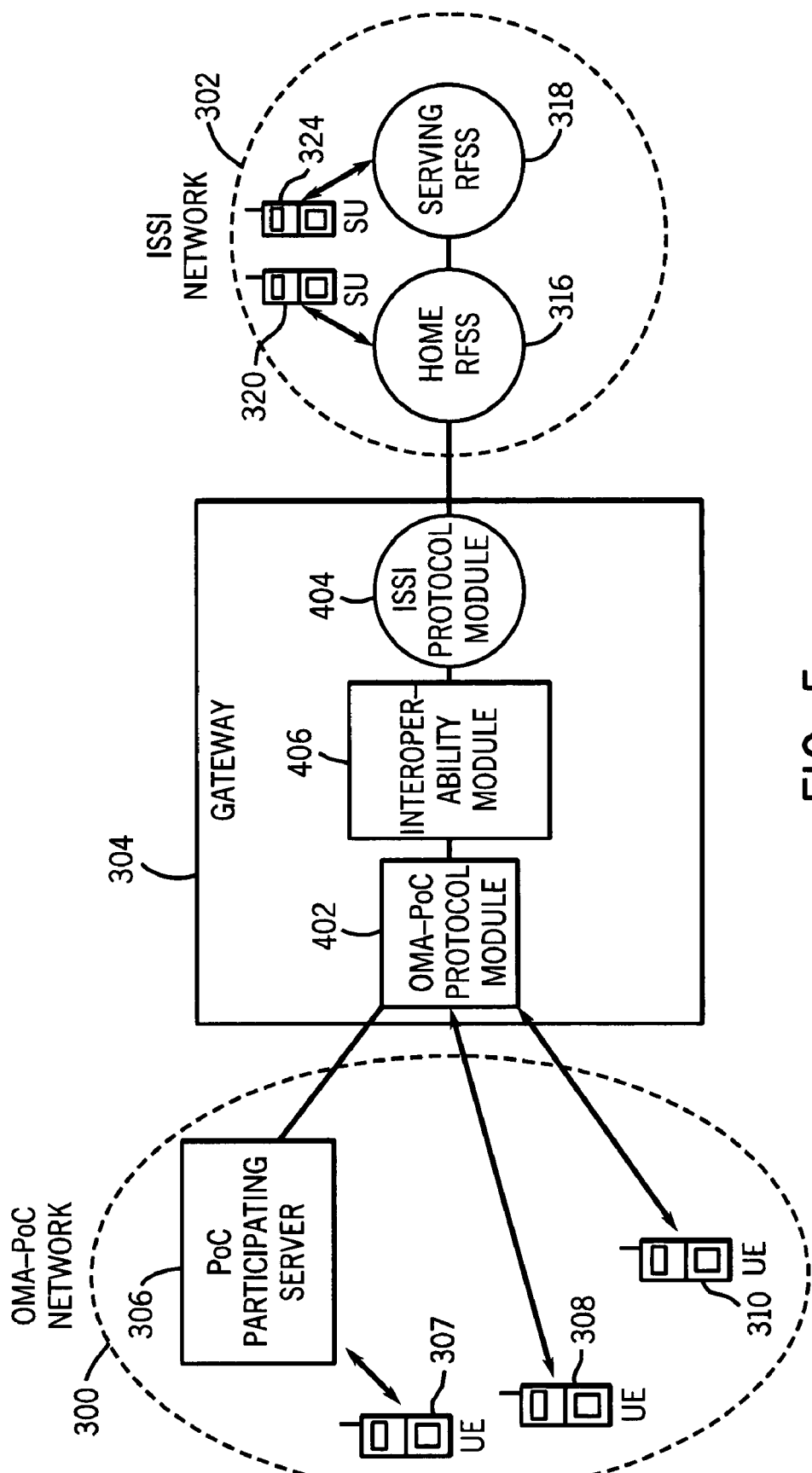
FIG. 5 is an illustration of an exemplary configuration with the home of a talk group in the PS-network.

In FIG. 5 an example is provided where the home of the group resides in the P25 network. GW 304 is connected (through RTP) to UEs 307, 308 and 310 in OMA-PoC network 300. The GW is also connected to the home RFSS of the group, RFSS 316, in the P25 network 302. In this scenario, the OMA-PoC protocol module 402 in GW 304 behaves like a PoC controlling server to all the UEs in the OMA-POC network. The ISSI protocol module 404 in the GW behaves like a serving RFSS to RFSS 316. Other serving RFSSs, e.g. RFSS 318, can be connected to the home RFSS 316. SUs 320 and 324 are connected to the RFSS.

RTP Packet Format

Figure 6A:
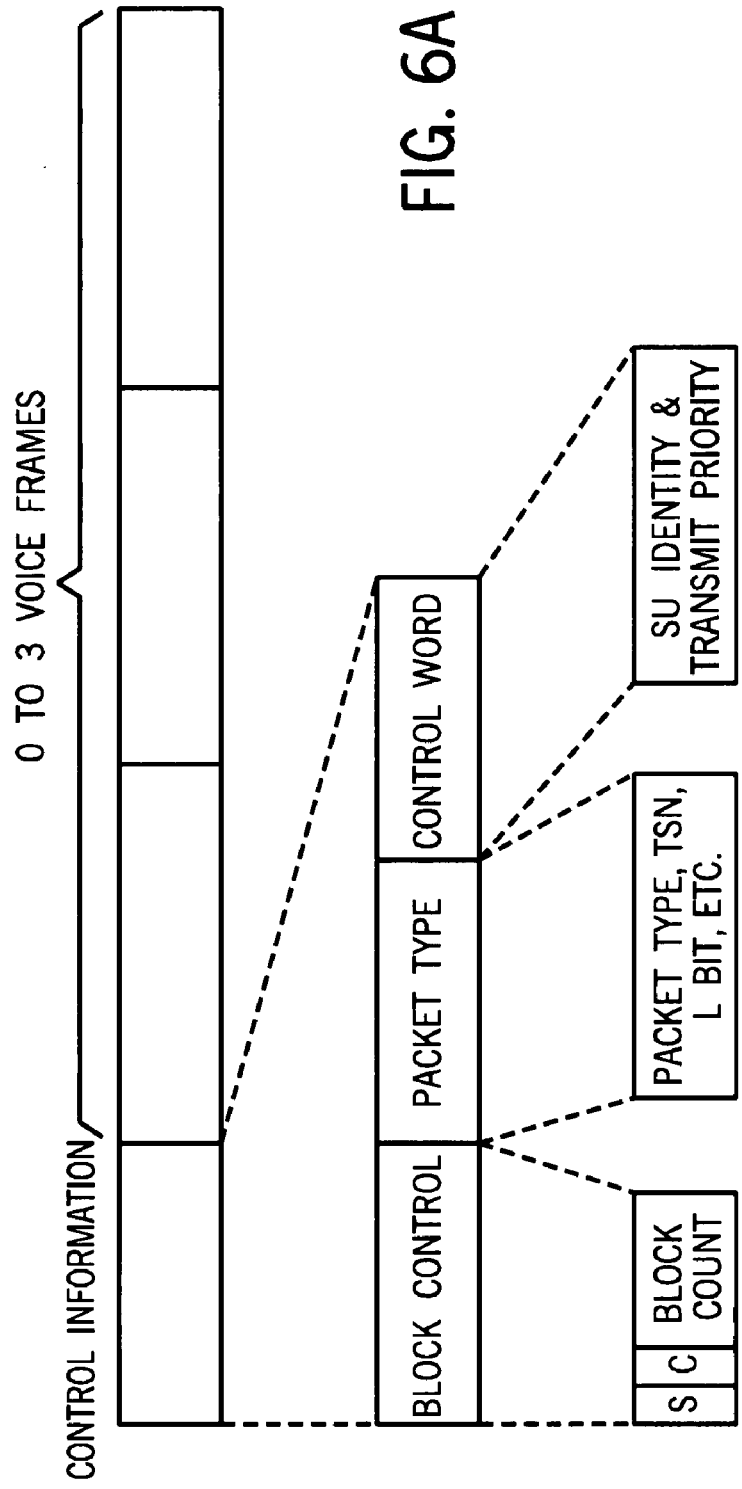
FIG. 6A shows the structure of an exemplary ISSI RTP packet.
Figure 6B:
FIG. 6B shows the format of an exemplary block header in an ISSI packet.

In OMA-PoC, the format of the RTP packets is not specified so that the specification is independent of the audio codec used as well as the payload format. In ISSI, the RTP format is specified. The structure of an ISSI packet is illustrated in FIGS. 6A and 6B. Each ISSI RTP packet consists of a control information field and 0 to 3 voice frames. These are encoded as blocks in the packet. The control information field contains: the S bit indicating whether the information is from a home or serving RFSS; the C bit indicating whether the compact form is used or not; block count, i.e. number of blocks contained in the packet. The packet type data block contains: first data that indicates the type of PTT packets of the current packet; PTT-transmit-request, PTT-transmit-grant, etc.; service order containing information how the information should be treated by RFSS and over the air; transmission sequence number (TSN) used to delineate talk spurts within a group call; losing audio indicator used to indicate whether the accompanying voice frames are preferred audio or losing audio. The Control Word (block) contains information on the identity of the SU as well as the transmission priority. The voice data frames (blocks) contain voice information.

As shown in FIG. 6B, each block in the RTP packets contains a block header, which contains: an E bit that is always set to 1; block type information; a timestamp offset; the length of the data block in octets.

Transmission Interoperability

From Home RFSS to Gateway

Figure 7:
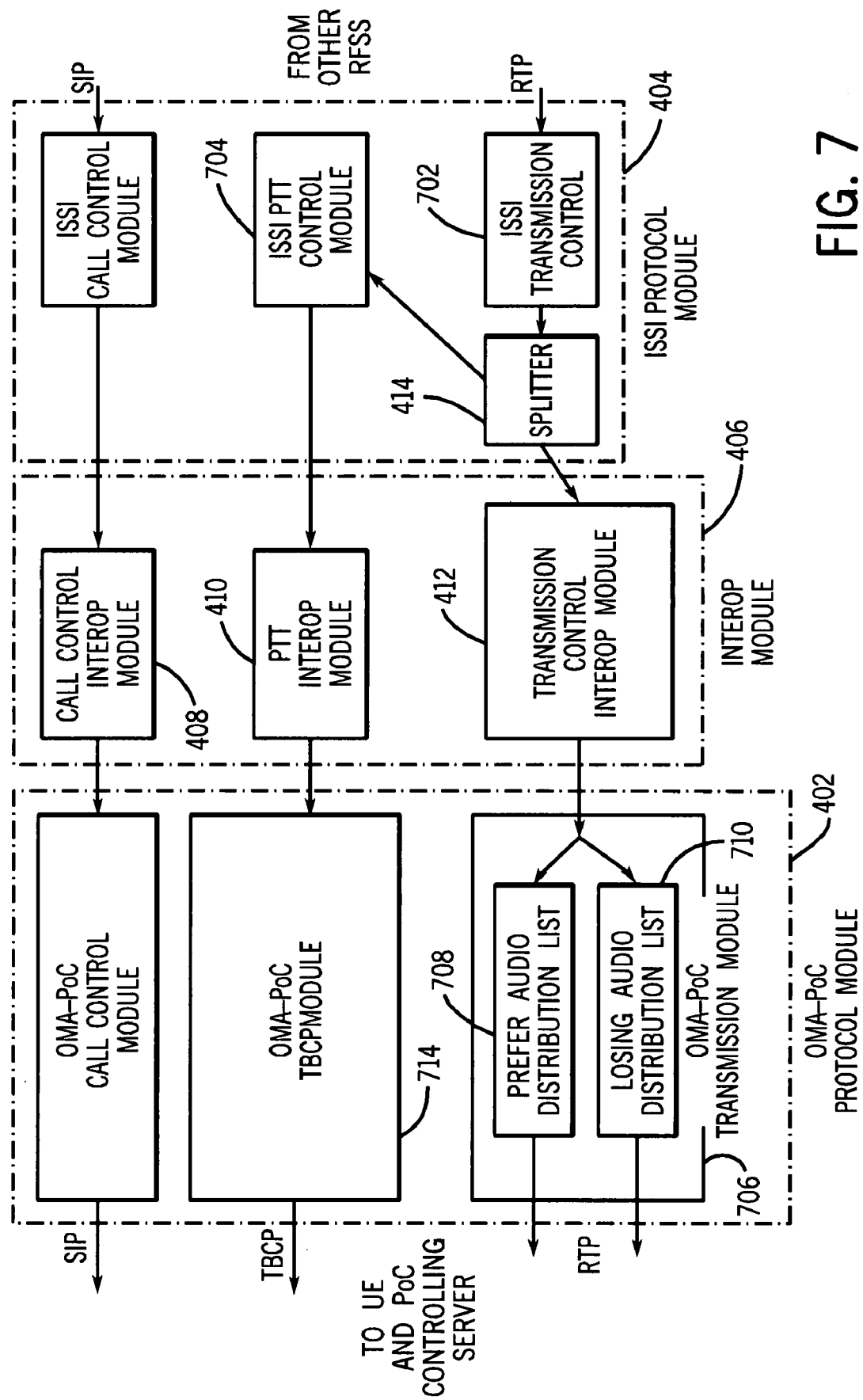
FIG. 7 illustrates illustrative functional logic for transmission control for a packet traveling from the PS-network to the commercial wireless network.

Referring to FIG. 7, it is assumed that the OMA-PoC network uses the same codec and RTP packet format as specified in the ISSI, although this is not necessary. The ISSI transmission control module 702 upon the receipt of an ISSI RTP packet from the home RFSS forwards the RTP packet to the splitter 414. The splitter 414 extracts the PTT control information from the RTP packets (i.e., the packet type) and sends information to the ISSI PTT-control-module 704 to be processed as specified in the ISSI specification. As a result of this processing, the ISSI PTT control module 704 forwards the result to PTT-interop module 410. PTT control interoperability will be described in more detail below. If the RTP packet contains any voice frames, the packet will also be forwarded to the transmission interop module 412

Upon the receipt of RTP packets from splitter 414, the transmission interop module 412 performs all necessary translations such as changing the SU identity in the control word to the identity of a UE. The transmission interop module 412 then forwards the RTP packet to OMA-PoC transmission module 706, which will distribute the packets to the UEs. The OMA-PoC transmission module 706 maintains two distribution lists, a preferred audio list 708 and a losing audio list 710. When sending RTP packets to the UE, the PTT packet type is always encoded PTT-transmit-progress, as these packets always contain voice frames. At the same time, PTT-control information is already extracted and sent as TBCP packets to the UEs. The marking of these packets as PTT-transmit-progress packets can be executed by splitter 414, PTT-interop module 412, or OMA-PoC transmission module 706.

Adding the losing audio distribution list to the OMA-PoC module represents an enhancement to the normal OMA-POC specification. An alternate embodiment would be to put this distribution list at the gateway.

From OMA-PoC User Equipment (UE) to Home RFSS

Figure 8:
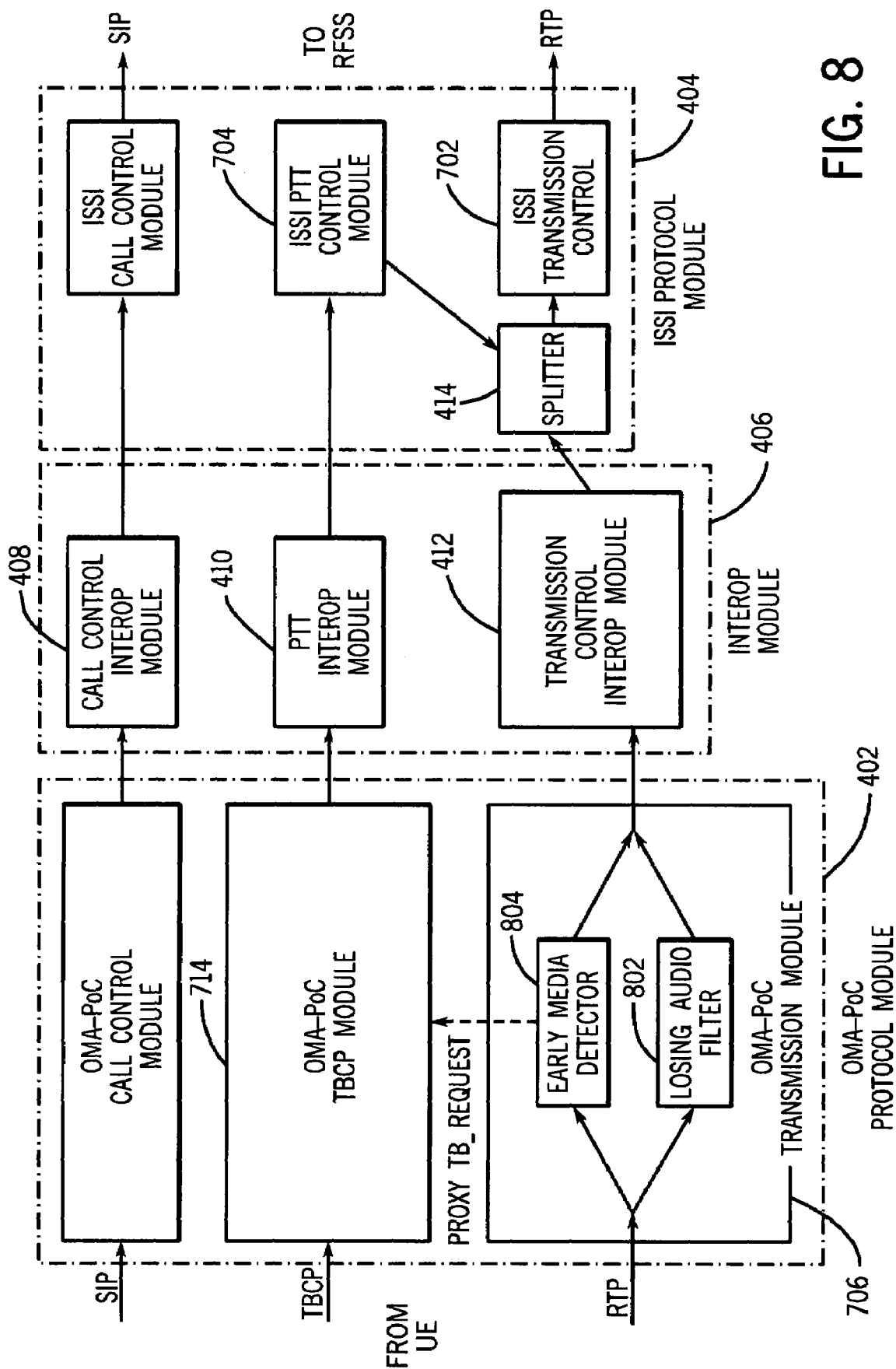
FIG. 8 illustrates illustrative functional logic for transmission control for a packet traveling from the commercial wireless network to the PS-network.

Referring to FIG. 8, the transmission control for packets going to the home RFSS in the P25 network is illustrated. RTP packets from the UE are received at the OMA-transmission module 402. These RTP packets are marked as PTT-transmit-progress packets as these contain only voice frames (PTT-control information is sent as TBCP packets). First, losing audio filtering module 802 determines whether the incoming packets are part of a losing audio stream. If they are, it will check whether the UE is authorized to send losing audio or not. It will filter out the packets if necessary. The GW supports "early media" by early media detector 804 that determines whether the incoming RTP packets are part of an early media stream. If they are, module 804 will generate a proxy "TB-request" to the OMA-PoC TBCP module on the behalf of the UE. Module 706 then forwards the packet to transmission interop module 412.

Transmission module 412 will execute any necessary translation such as changing UE ID to SU ID. It will then forward the packet to splitter 414 which functions as a combiner for packets going to the RFSS. For some packets, combiner 414 may change the packet type from PTT-transmit-progress to other PTT control packet type as demanded by the ISSI PTT control module 704. Combiner 414 then sends the packet to ISSI transmission control 702 to be forwarded to the home RFSS.

Using Different Codec and RTP Format in OMA-POC Network

If the OMA-PoC network uses a different voice codec than the one in the P25 network, transcoding will take place in the transmission interop module 406 in both directions. It is also possible that the OM-POC network uses a different formatting structure than the one specified by ISSI. However, in order to support losing audio efficiently, the RTP packet should support losing audio indication and speaker identity (or other means to identify a talk spurt).

An alternate embodiment would be to put losing audio on separate RTP connections. In this case, each losing audio stream will use a different UDP port. These extra ports are set up when the UE initializes with the GW in the SDP definition. This implementation is not as efficient as the one specified above by encoding losing audio indicator and speaker ID within the RTP packet.

Push to Talk Interoperability

Figure 9:
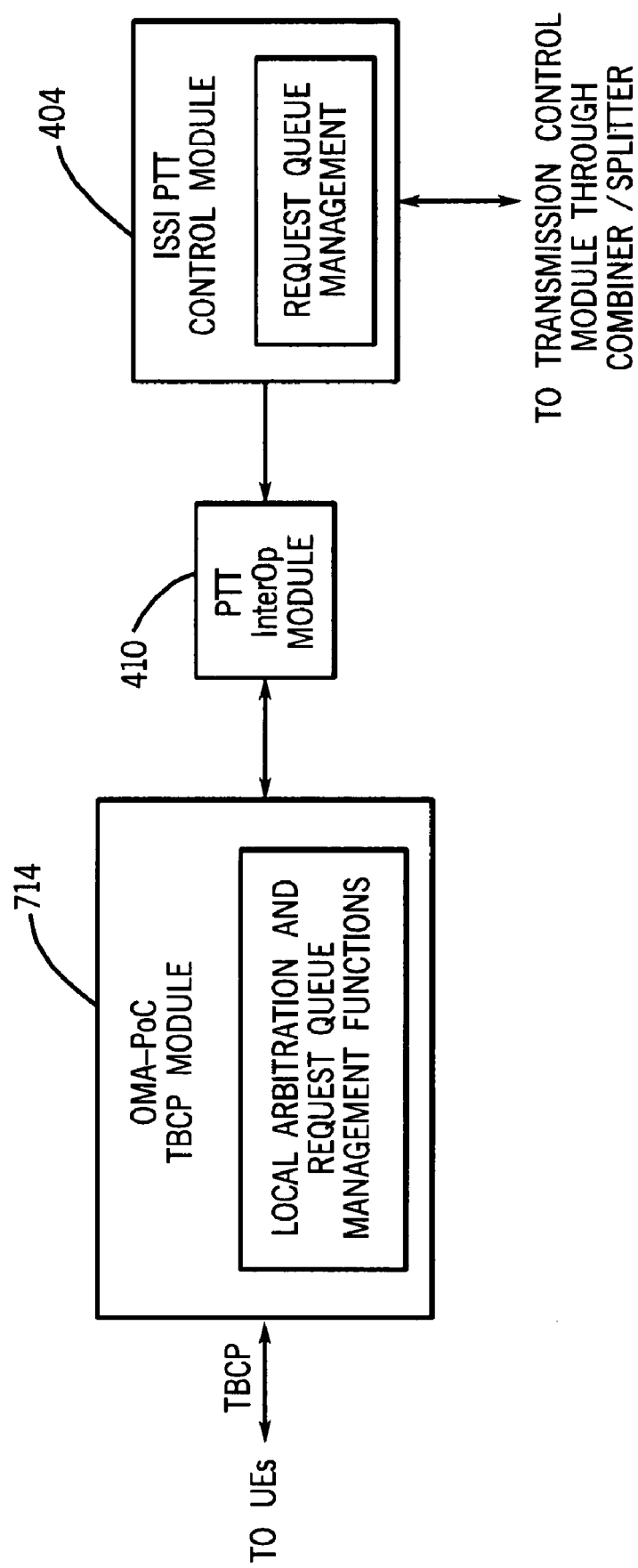
FIG. 9 is an illustrative architecture of PTT interoperability.

Referring to FIGS. 8 and 9, when the home of the talk group is at a RFSS in the P25 network, the GW will act as a PoC server to the UEs. RTP and RTCP connectivity will be set up between the GW and the UEs. When a user wants to speak, the UE will send a TB-request to OMA-POC TBCP module 714 at the GW. It is possible that multiple UEs may want to request the floor roughly at the same time. Therefore, the OMA-PoC TBCP module 714 will arbitrate all the requests from the UEs and selected a local winner. Once the local winner is selected, OMA-PoC TBCP module 714 will forward the request to ISSI PTT Control module 404 through the PTT interop module 410. The ISSI PTT control module 404 will generate a PTT-transmit-request, on the behalf of the UE, and forward it to combiner 414. Combiner 414 will insert the PTT-transmit-request into a RTP packet which is then sent to the home RFSS through ISSI transmission control module 702.

Upon the receipt of requests from the GW or other serving RFSS, the home RFSS 316 will award the floor to a global winner of the group. The decision is sent to the GW as PTT control blocks in a RTP packet. There are several aspects to this process. There is delay between the request being sent to the home RFSS and the reply from the home RFSS. The floor can be awarded to SUs at other RFSS at any time, not necessarily in response to request from the GW. Because of the time lag, the global floor (as determined by the home RFSS) winner may have a lower preemptive priority than the local floor winner (as determined by the GW), for some short period of time. Also, after sending a request but before receiving any response from the home RFSS, the identity of the local winner may change (i.e., a high priority call from another UE arrives).

The function of PTT interop module 410 is to manage the above issues. As such, there are two logical objects in this module: the local floor winner and the global floor winner, each with its associated priority. The PTT interop module 410 deals with the floor winners, and so implicitly only the preferred audio stream. A UE may, depending on the policy at the GW, send losing audio stream at any time, regardless of the global floor winner at that time. Both OMA-Poc and ISSI do not specify a required arbitration method or request queue management; these functions are left to individual implementations and embodiments. The embodiment of the GW subscribes to the same philosophy and will accommodate any arbitration algorithm and request queue management algorithm.

Messages Between the OMA-POC TBCP Module and the PTT InterOp Module

Messages from OMA-POC TBCP module 714 to the PTT-interop module 410 include PoC-local-winner-change and PoC-Cancel. The PoC-local-winner-change message is used to indicate to the PTT interop module that there is change of the identity of the local floor winner. The message contains the identity of this UE and as well as the priority of the new request. The priority of the new local winner could be higher, lower or equal to the priority of the previous local winner. A null value for local winner identity is acceptable. This means that the previous local winner has cancelled its request or terminated its call, and there are no other UEs requesting the floor. The PoC-Cancel message is used to cancel a previous request. The message would contain the identity of this UE and as well as the priority of the request that is to be cancelled. Functionally, a PoC-Cancel is very similar to a PoC-local-winner-change (null), but with a slight difference. The POC-Cancel message cancels a very specific request (e.g., from UE1), while the PoC-local-winner-change (null) message will cancel the outstanding local floor winner, regardless of its identity. Where the PTT interop module 410 and OMA-PoC TBCP module 714 do not reside in the same physical unit, the PoC-Cancel message would be more robust in some situations as messages may be lost or mis-ordered. The illustrative GW will support both. The messages described herein are functional messages. The following naming convention is used to label the messages. A message with the prefix "PoC" is from or to the OMA-PoC TBCP module. A message with the prefix "P25" is from or to the ISSI PTT control module.

Messages from the PTT-interop module 410 to the OMA-POC TBCP module 714 include:

PoC-Grant: This message is used to indicate to the OMA-PoC TBCP module that a UE has been granted the floor and becomes the global winner.

PoC-Deny: This message is used to indicate to the OMA-PoC TBCP module that a request from a UE has been denied.

PoC-taken: This message is used to indicate to the OMA-PoC TBCP module that the floor has been granted to an SU not at this GW.

Messages Between the ISSI PTT Control Module and the PTT InterOp Module

These messages are very similar to those between the OMA-PoC TBCP module and the PTT interop module as described in the previous section. The major differences are UEs are identified by SU-ID instead of UE-ID. This implies that the PTT interop module will perform the identity translation. Although a UE is identified by its SUID at this interface, the term UE is still used to designate the device. For messages from the OMA-POC TBCP module to PTT interop module interface, the PTT interop module is the master. Between the PTT interop module and the ISSI PTT control module, the ISSI PTT control module is the master. In an alternate embodiment, the UEID is used as the identifier for devices. In this case, the conversion would take place at the ISSI module. Other variations are also possible.

Messages from the PTT-interop module to the ISSI PTT control module are:

P25-local-winner-change: This message is used to indicate to the ISSI PTT control module that there is change of the identity of the local floor winner. The message contains the identity of this UE and as well as the priority of the new request. Null value is acceptable.

P25-Cancel: This is message is used to cancel a previous request. The message contains the identity of this UE and as well as the priority of the request that is to be cancelled.

Messages from the ISSI PTT control module to the PTT-interop module include:

P25-Grant: This message is used to indicate to the PTT-interop module that a UE has been granted the floor and becomes the global winner.

P25-Deny: This message is used to indicate to the PTT interop module that a request from a UE has been denied.

P25-Taken: This message is used to indicate to the PTT-interop module that the floor has been granted to an SU not at this GW.

P25-Revoke: This message is used to revoke the current local floor winner.

Processing Logic and States at the PTT InterOp Module

As stated previously, the PTT interop module contains two logical objects, the local floor winner and its associated priority; and the global winner and its associated priority. The values of these two objects will determine the current state of the PTT interop module. The module can have the following states:

Idle: There is no local winner and no global winner (i.e. the talk group is not active)

Request pending: There is a local winner, but no global winner. The ISSI PTT control module has been informed of the ID of the local winner.

Local-has-floor: The local winner is also the global winner and is the current winner of the floor.

Local>Global: There are both a local winner and a global winner. The priority of the local winner is greater than that of the global winner. The ISSI PTT-control has been informed of the identity and priority of the local winner. It is expected that it will generate a PTT-transmit-request to the home RFSS on the behalf of the local winner. This should be transient state; there will be a new global winner soon. (Note: The new global winner may or may not be the local winner).

Local≦Global: There are both a local winner and a global winner. The priority of the local winner is less than on equal to that of the global winner.

Global-winner-no-local: There is no local winner but there is a global winner.

State Transition Logic

In the following, the pair (UE1, P1) designates a UE and the priority of its request. Although user devices are attached to one or the other network, user devices will have identifiers in both the OMA-PoC and P25 network. However, to avoid confusion, the term UE1 is used to designate a device attached to the OMA-PoC network regardless of the identifier used. Similarly, the term SU is used to designate a device attached to the P25 network. At any state, upon receipt of any unexpected messages, messages should be discarded.

At Idle State

Figure 10:
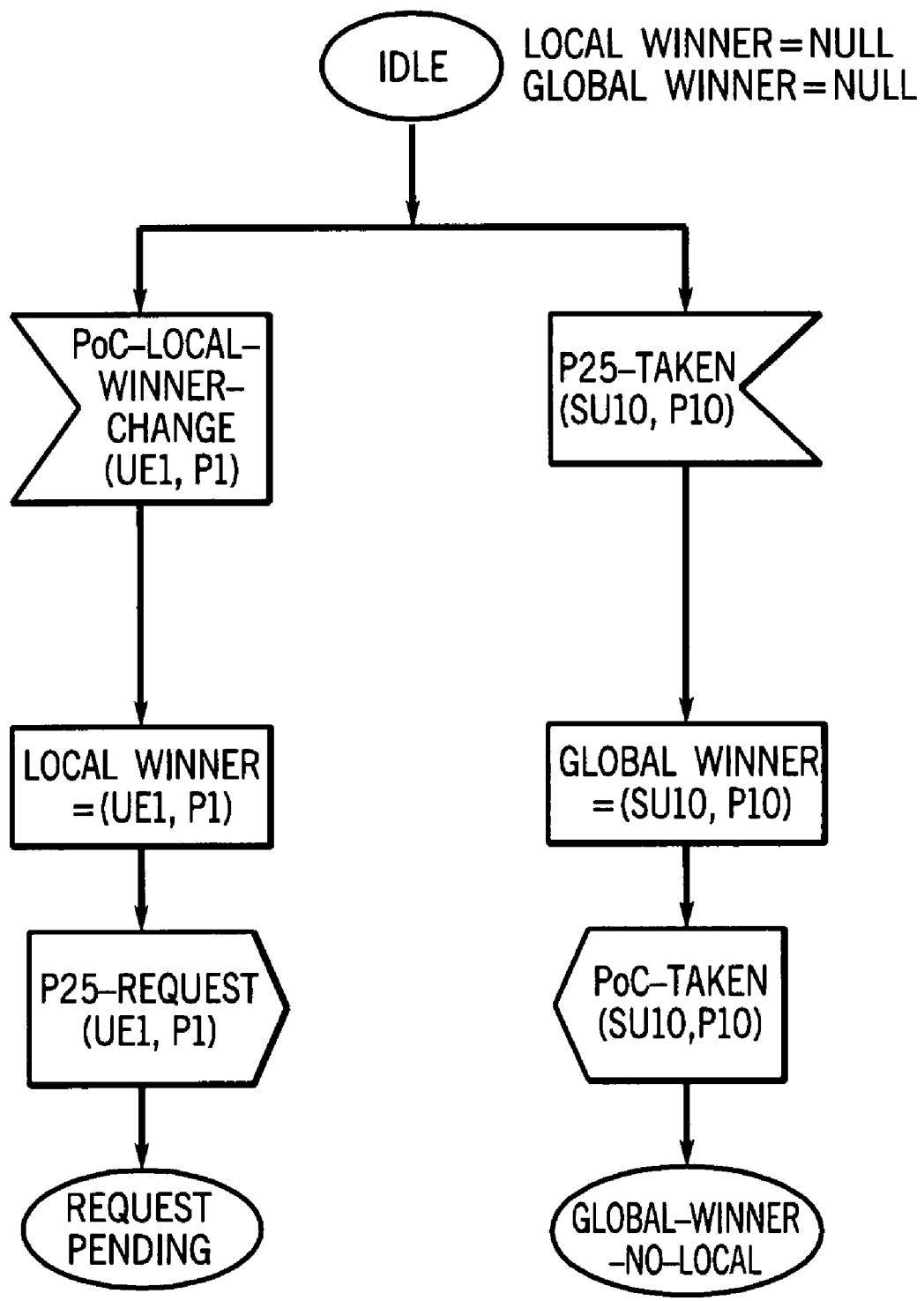
FIGS. 10-15 show illustrative state transitions for the PTT interoperability module of FIG. 9. The states are Idle (FIG. 10), Request-Pending (FIG. 11), Global-Winner-No-Local (FIG. 12), Local>Global (FIG. 13), Local<Global (FIG. 14), and Local-has-Floor (FIG. 15).

Referring to FIG. 10, when at this state, there is no local winner and no global winner, the PTT interop module:

Upon the receipt of a PoC-local-winner-change (UE1, P1), where UE1 and P1 are the identity of the UE and the priority of the request respectively, the PTT interop module will:

Update the identity of the local winner and priority to (UE1, P1);

Send the P25-local-winner-change (UE1, P1) to the ISSI PTT control module;

Then enter the Request-pending state.

Upon the receipt of a ISSI-Taken (SU10, P10) from the ISSI PTT control module:

Update the global owner to (SU10, P10);

Send a PoC-Taken (SU10, P10) to the OMA-POC TBCP module;

Enter the Global-winner-no-local state.

At the Request-Pending State

Figure 11:
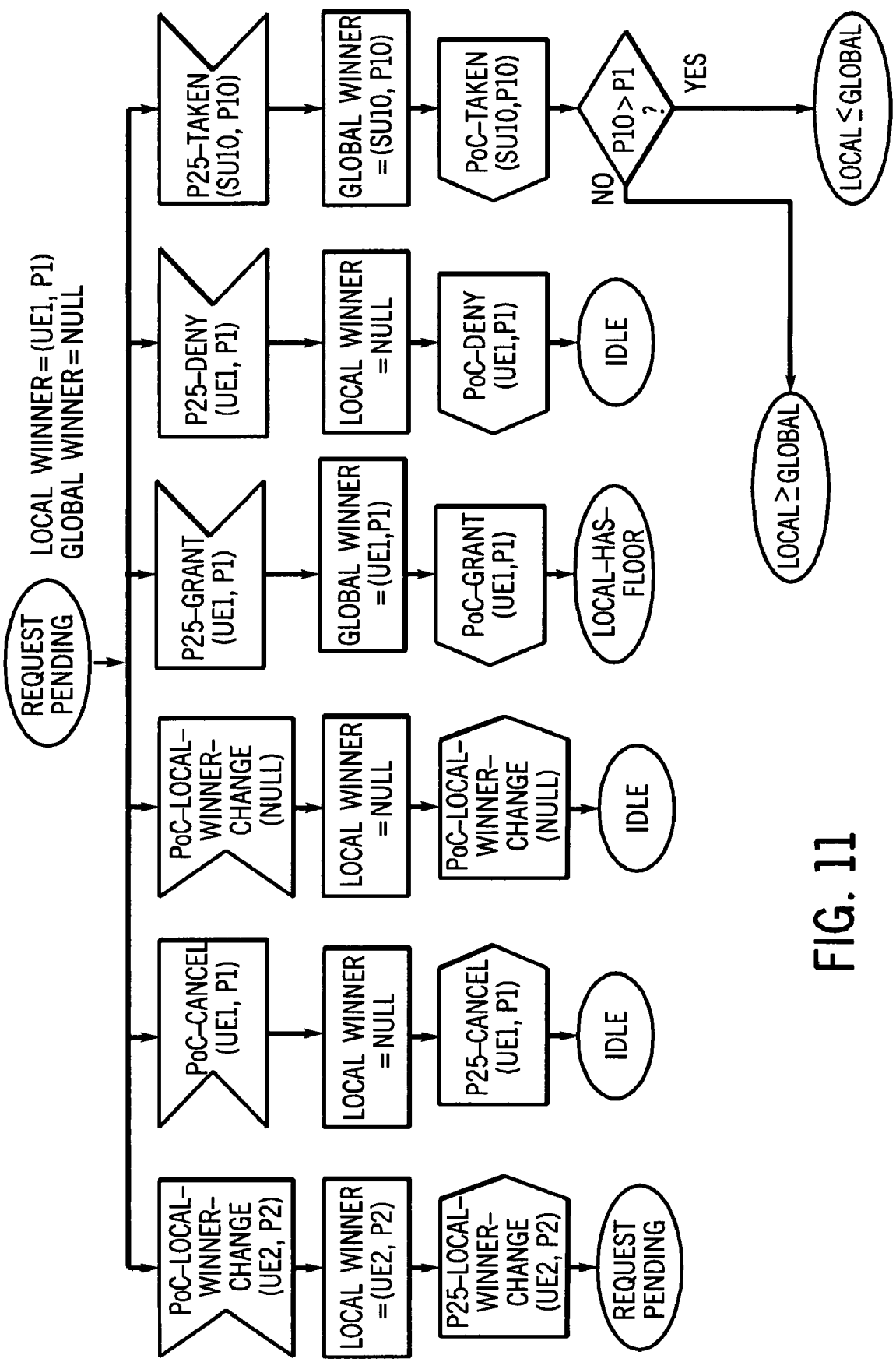

Referring to FIG. 11, there is a local winner (UE1, P1), but no global winner.

Upon the receipt of P25-Grant (UE1, P1) from the ISSI PTT control module,

Update the global winner to (UE1, P1);

Send PoC-Grant (UE1, P1) to OMA-PoC TBCP module;

Enter the Local-has-floor state.

Upon the receipt of P25-Deny (UE1, P1):

Send PoC-Deny (UE1, P1) to OMA-PoC TBCP module;

Enter the Idle state.

Upon the receipt of P25-Taken (SU10, P10), the PTT interop module would:

Update the global winner to (SU10, P10);

Send PoC-taken (SU10, P10) to OMA-PoC TBCP module;

Compare the two priorities P1 and P10:

If the P10≧P1, enters the Local≦Global state

If the P10≦P1, enters the Local>Global state

Upon the receipt of PoC-Cancel (UE1, P1):

Update local winner to null;

Send P25-Cancel (UE1, P1) to ISSI PTT control module;

Enter the Idle state.

Upon the receipt of PoC-local-winner-change (null):

Update local winner to null;

Send P25—local-winner-change (null) to ISSI PTT control module;

Enter the Idle state.

Upon the receipt of PoC-local-winner-change (UE2, P2):

Update local winner to (UE2, P2);

Send P25-local-winner-change (UE2, P2) to ISSI PTT control module;

Remain in the request-pending state.

At Global-Winner-No-Local State

Figure 12:
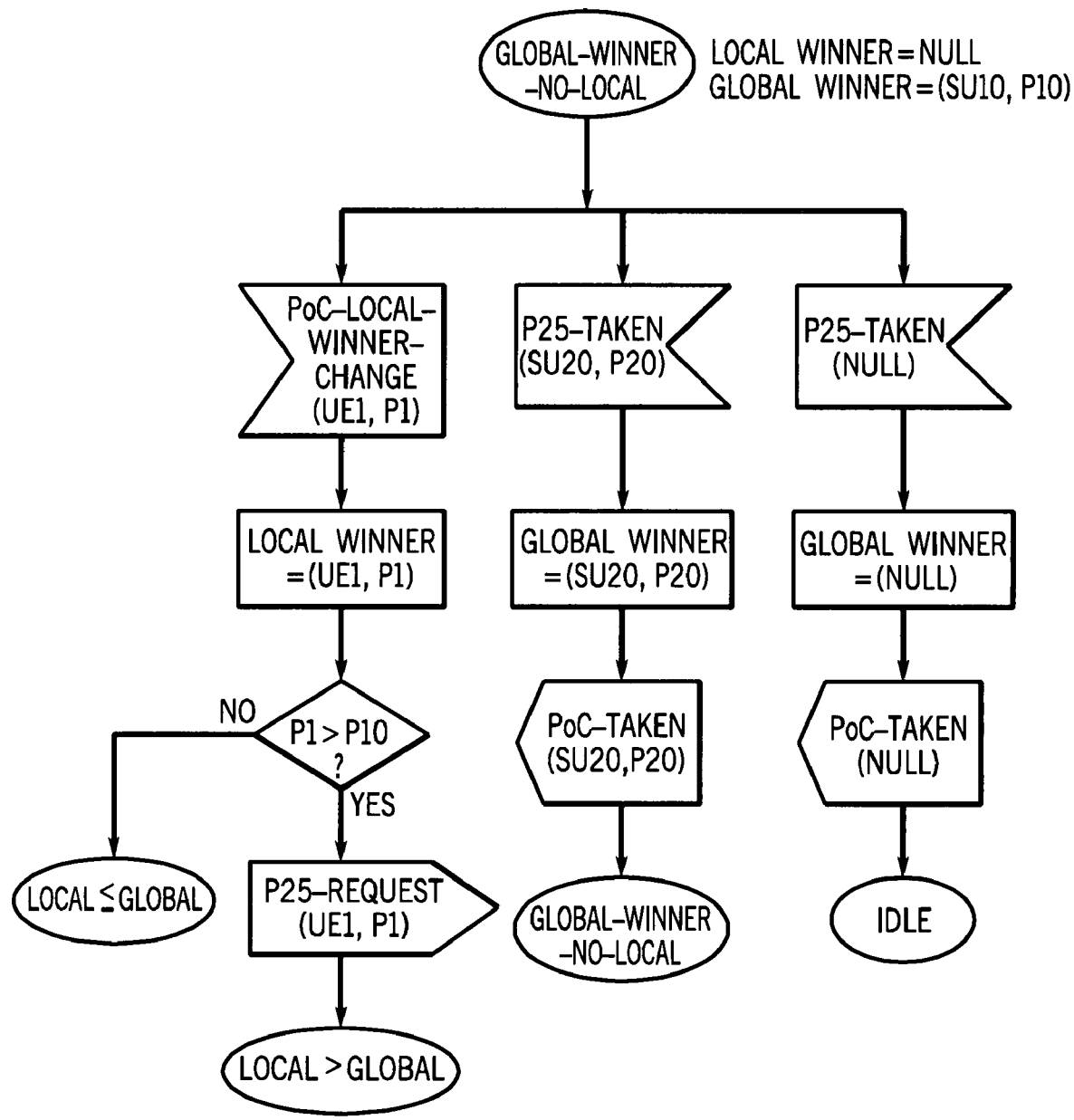

Referring to FIG. 12, there is global winner (SU10, P10), but no local winner.

Upon the receipt of a PoC-local winner-change (UE1, P1) from the OMA-PoC TBCP module, the PTT interop module would first update the local winner to (UE1, P1) and then compare the two priorities P1 and P10:

If P1≦P10, enter the Local≦Global state.

If P1>P10, send P25-local winner-change (UE1, P1) to ISSI PTT control module, and enter the Local>Global state.

Upon the receipt of P25-Taken (SU20, P20):

Update global winner to (SU20, P20);

Send PoC-Taken (SU20, P20) to OMA-PoC TBCP module

Remain in the current state.

Upon the receipt of P25-Taken will a null value:

Update global winner to null;

Send PoC-Taken (null) to OMA PoC TBCP module;

Enter the Idle state.

At Local>Global State

Figure 13:
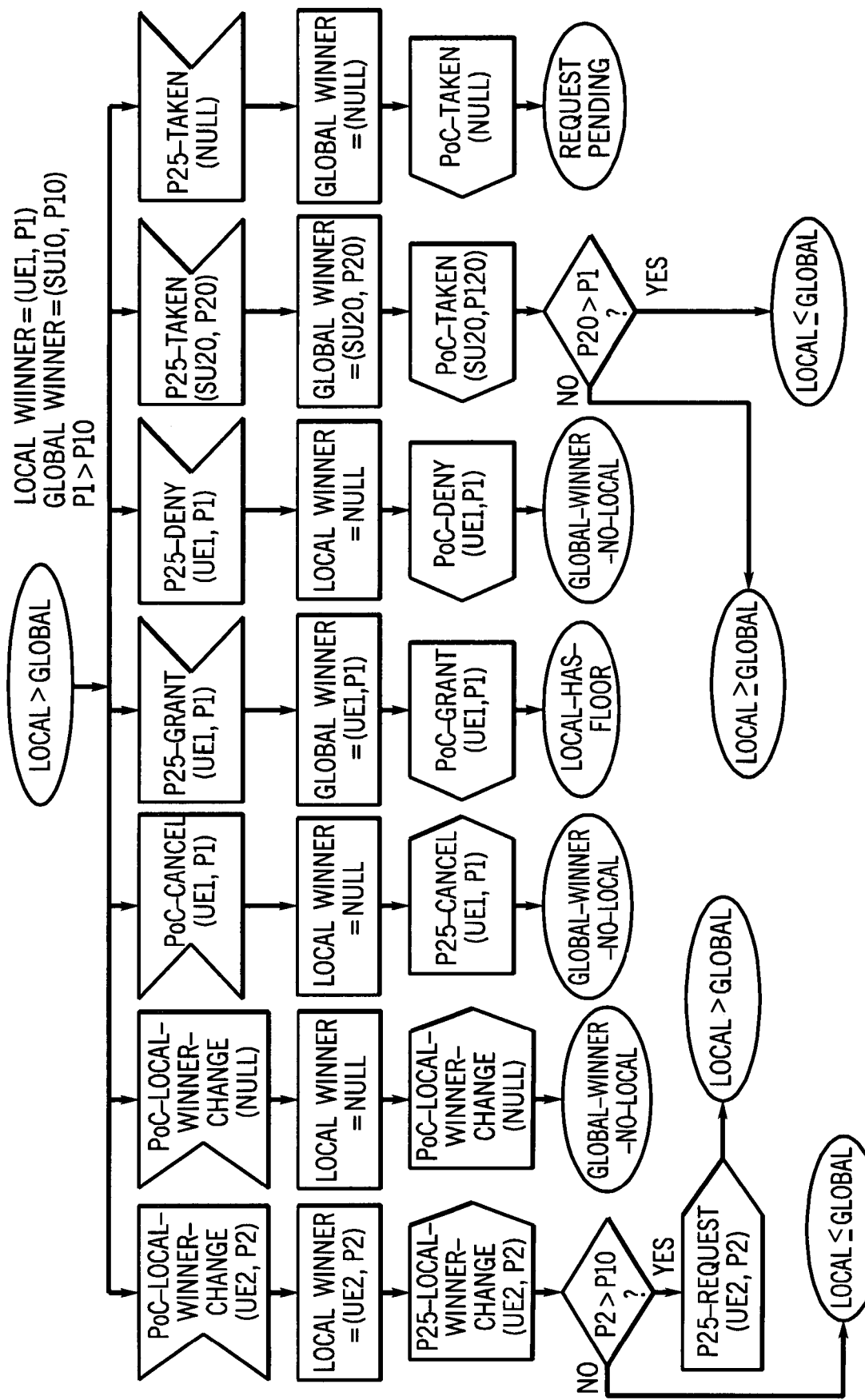

Referring to FIG. 13, there are both a local winner (UE1, P1) and a global winner (SU10, P10) and they are not the same. Also, P1 is of higher priority than P10.

Upon receipt of P25-Grant (UE1, P1), send PoC-Grant (UE1, P1) to OMA-PoC TBCP module and enter the Local-has-floor state.

Upon receipt of a P25-Deny (UE1, P1):

Update local winner to null;

Send PoC-Deny (UE1, P1) to OMA-PoC TBCP module;

Enter the Global-winner-no-local state.

Upon the receipt of P25-Taken (SU20, P20):

Update global winner to (SU 20, P20);

Send PoC-Taken (SU20, P20) to OMA-POC TBCP module;

Compare P20 with P1:

If P20≧P1, enter the Local≦Global state:

If P20<P1, remain in this state.

Upon the receipt of P25-Taken (null):

Update global winner to null;

Send PoC-Taken (null) to OMA-POC TBCP module;

Enter the Request-pending state.

Upon the receipt of a PoC-Cancel (UE1, P1) from the OMA-PoC TBCP module, the PTT interop module will:

Update the local winner to null;

Send a P25-Cancel to the ISSI PTT control module;

Enter the Global-winner-no-local state.

Upon the receipt of a PoC-local-winner-change (null) from the OMA-PoC TBCP module, the PTT interop module will:

Update the local winner to null;

Send a P25-local-winner-change (null) to the ISSI PTT control module;

Enter the Global-winner-no-local state.

Upon the receipt of PoC-local-winner-change (UE2, P2):

Update local winner to (UE2, P2);

Send P25-Local-winner-change (UE2, P2) to ISSI PTT control module;

Compare P2 with P10:

If P2>P10, send P25-local-winner-change (UE2, P20) to ISSI PTT control module and remain in the Local>Global state;

If P2<P10, enter the Local≦Global state.

At Local≦Global State

Figure 14:
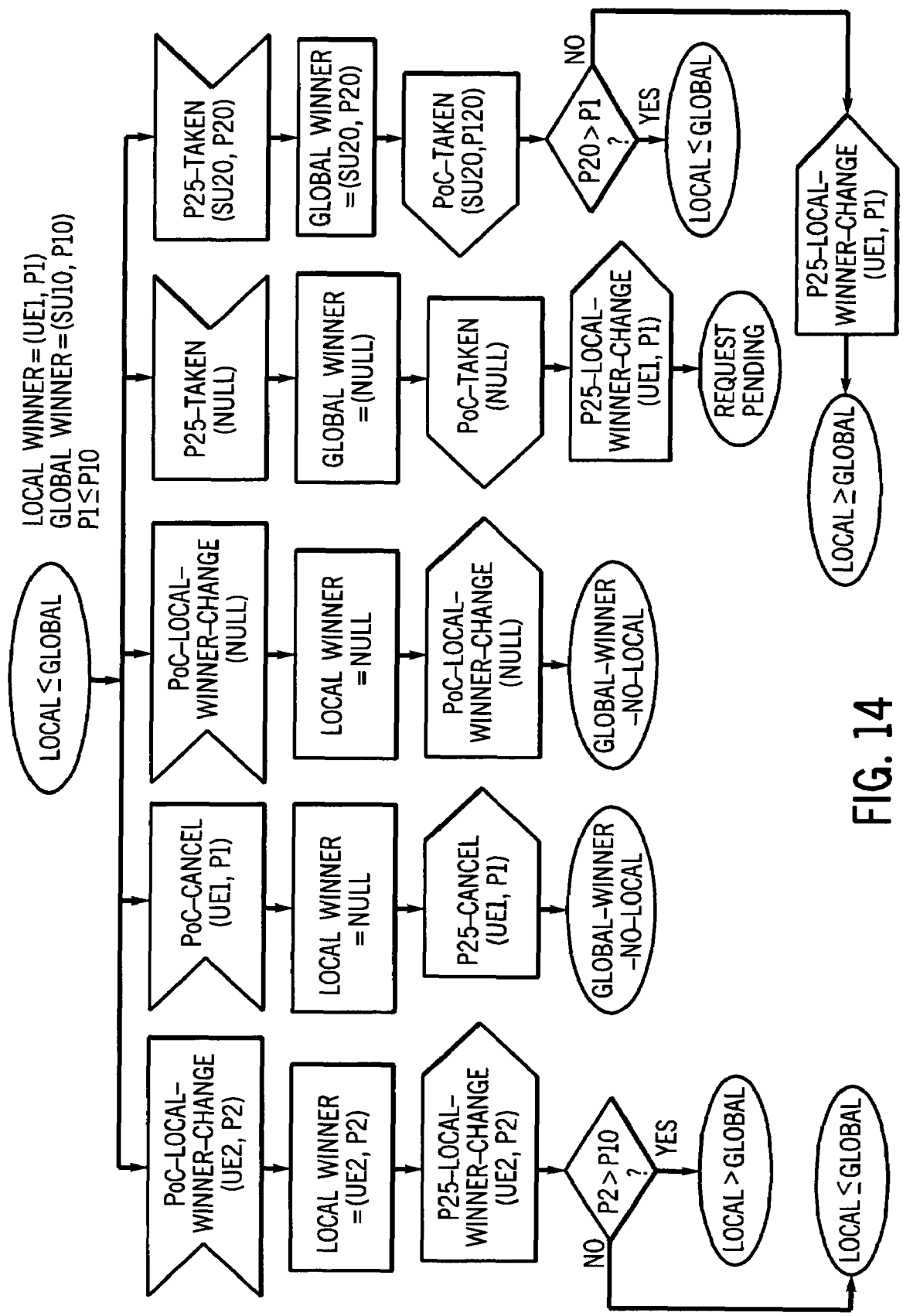

Referring to FIG. 14, there are both a local winner (UE1, P1) and a global winner (SU10, P10) and they are not the same. Also, P1 has a lower or equal priority than P10.

Upon the receipt of P25-Taken (SU20, P20):

Update global winner to (SU 20, P20);

Send PoC-Taken (SU20, P20) to OMA-POC TBCP module;

Compare P20 with P1:

If P20≧P1, remain the Local≦Global state;

If P20≦P1, send P25-local-winner-change (UE1, P1) to ISSI PTT control module and enter in the Local>Global state.

Upon the receipt of P25-Taken (null):

Update global winner to null;

Send PoC-Taken (null) to OMA-POC TBCP module;

Send P25-local-winner-change (UE1, P1) to ISSI PTT control module and enter in the Request-pending state.

Upon the receipt of a PoC-Cancel (UE1, P1) from the OMA-PoC TBCP module, the PTT interop module will:

Update the local winner to null;

Send P25-Cancel (UE1, P1) to the ISSI PTT control module;

Enter the Global-winner-no-local state.

Upon the receipt of a PoC-local-winner-change (null) from the OMA-PoC TBCP module, the PTT interop module will:

Update the local winner to null;
Send P25-local-winner-change (null) to the ISSI PTT control module;
Enter the Global-winner-no-local state.
Upon the receipt of PoC-local-winner-change (UE2, P2):
Update local winner to (UE2, P2);
Send P25-local-winner-change (UE2, P2);
Compare P2 with P10:
If P2>P10, remain in the Local>Global state;
If P2≦P10, enter the Local≦Global state.

At the Local-has-Floor State

Figure 15:
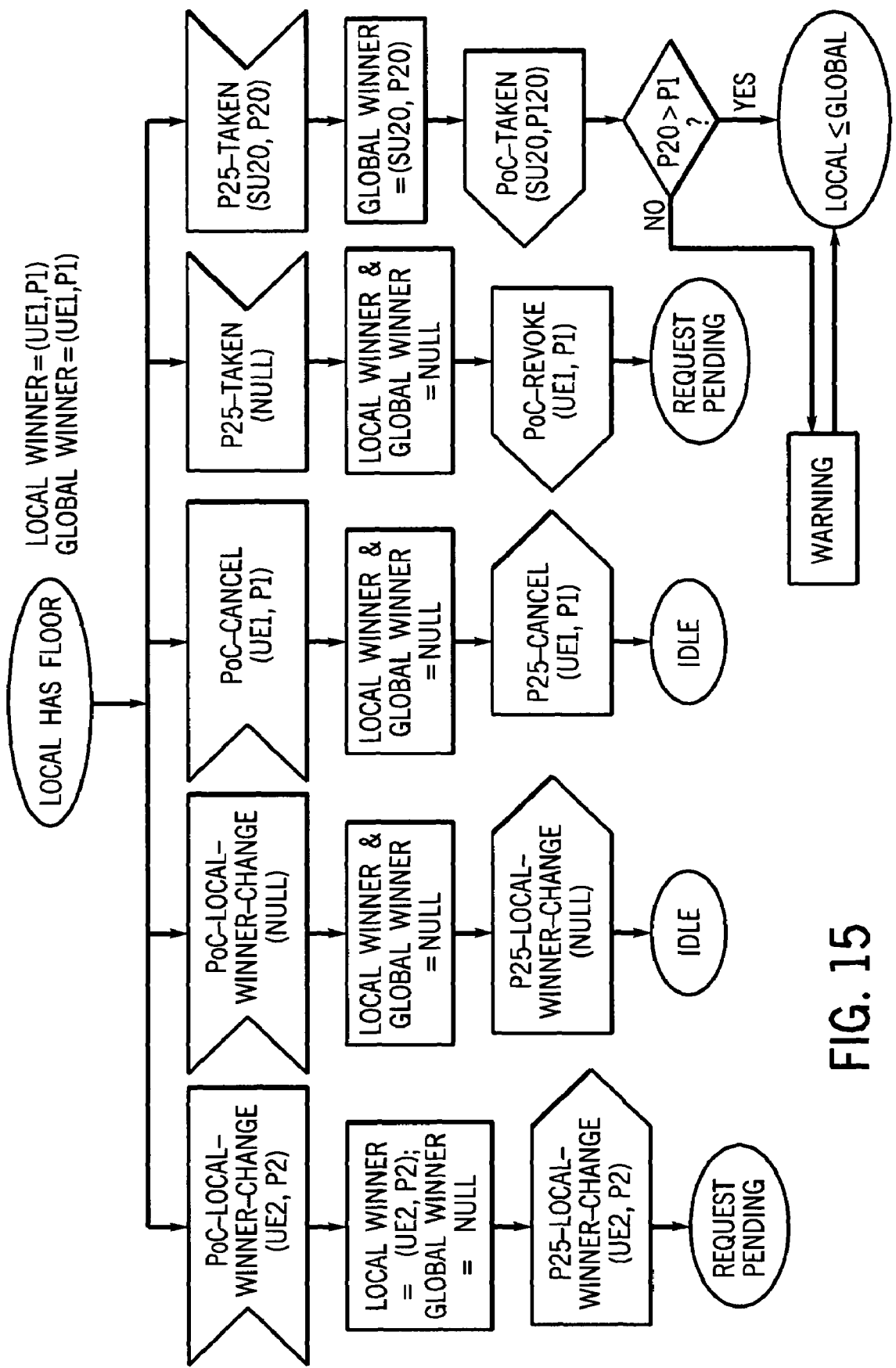

Referring to FIG. 15, the local winner (UE1, P1) is also the global winner.

Upon the receipt of a P25-Taken (SU20, P20) from ISSI PTT control module:

Update global winner to (SU20, P20);
Send PoC-taken (UE1, P1) to the OMA-PoC TBCP module. It is expected that, upon the receipt of this message, the OMA-POC TBCP module would first revoke the floor of UE1 and then inform all UEs that SU 2—now has the floor.
Compare P20 with P1:
If P1≧P20, send a warning message to management module indicating that "the local floor owner is pre-empted by a lower priority call". Note that this may happen because some messages are lost in the network.
Enter the Local≦Global state.

Upon the receipt of a P25-Taken (null) from ISSI PTT control module:

Update both global winner and local winner to null;
Send PoC-Revoke (UE1, P1) to the OMA-PoC TBCP module;
Enter the Idle state.

Upon the receipt of PoC-local-owner-change (UE2, P2):

Update local winner to (UE2, P2) and the global winner to null;
Send P25-local-winner-change (UE2, P2) to the ISSI PTT control module;

Note: The ISSI PTT control module would terminate the current call for (UE1, P1) by sending PTT-transmit-end and send a PTT-transmit-request for (UE2, P2).

Enter the Request-Pending state.

Upon the receipt of PoC-local-owner-change (null):

Update both the local and global owner to null;
Send P25-local-winner-change (null) to ISSI PTT control module;
Enter the Idle state.

Upon the receipt of PoC-Cancel:

Update both the local and global owner to null;
Send P25-Cancel to the ISSI PTT control module;
Enter the Idle state.

Overall State

Figure 16:
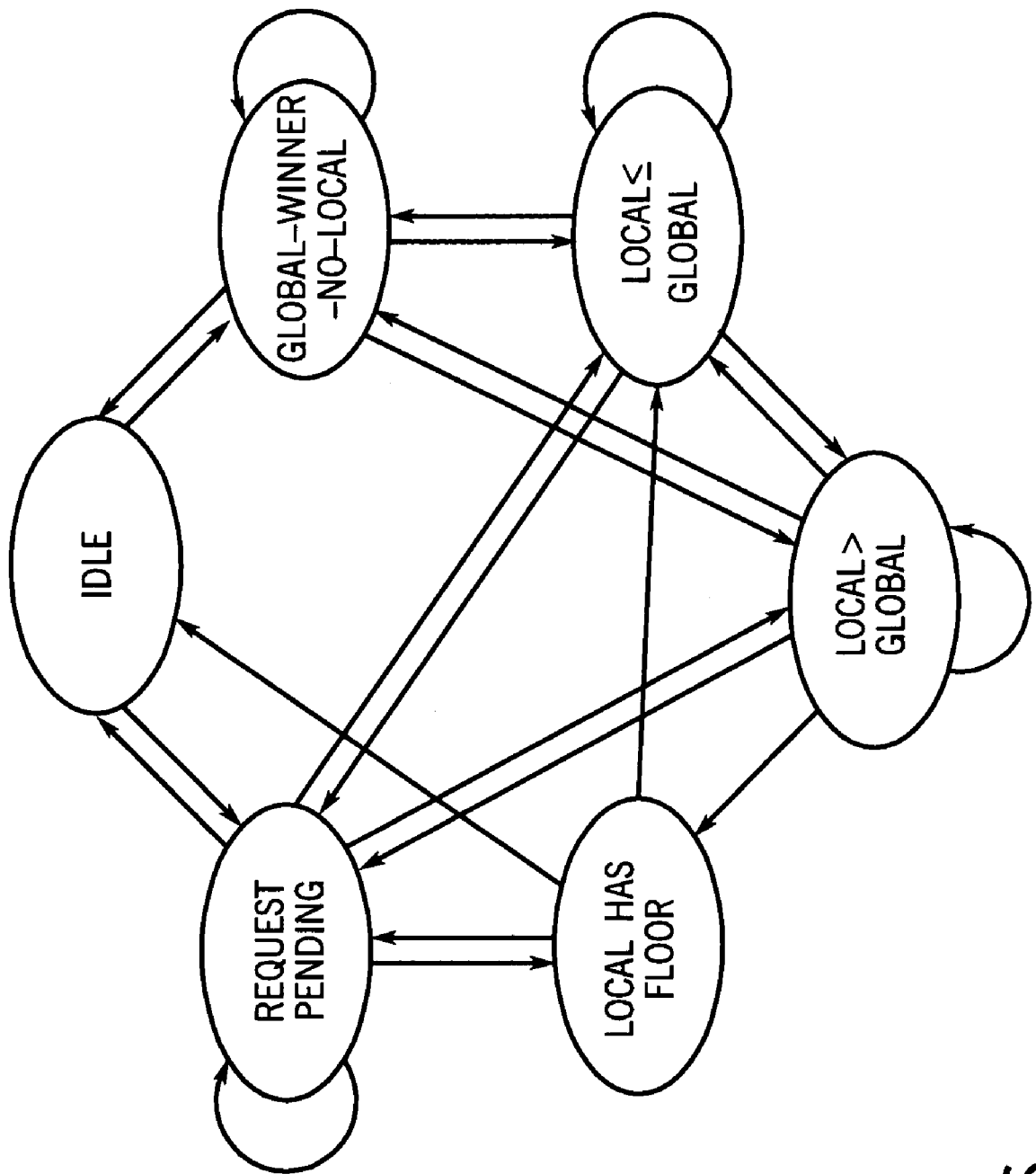
FIG. 16 shows illustrative overall state transitions for transitions between the states.

Referring to FIG. 16, an overall state transition diagram shows possible transitions between the states.

Summary on the Functions Performed by the PTT Interop Module

The PTT interop module manages the relationship between the local winner, which is selected according to the arbitration of the OMA-POC module, and the global winner which is selected by the home RFSS.

The ISSI PTT control module, upon receiving triggers from the PTT interOp module, will send ISSI PTT control packets to the home RFSS. However, there is delay between the request and request and there are also other SUs at other serving RFSS contending for the floor. Thus, there could be inconsistency between the local winner and global winner in that the local winner may have higher priority than the current global winner. Of course, the global winner as determined by the home RFSS, is the floor winner of the group at any time.

The interop module will trigger requests to the ISSI PTT Control module when the local winner has a high priority than the global winner. It will trigger this request at the most appropriate moment and not necessarily at the moment that the local winner arrives (e.g., at the moment of its arrival, the global winner at the time may have a higher priority). The interop module will also filter any unnecessarily messages from both the OMA-POC TBCP module and the ISSI PTT control module. It coordinates PTT activities between the two networks. The services provided the PTT intop module are especially required in embodiments where the OMA-POC protocol module and the ISSI protocol module reside in different physical units. In this case, there will be delay in message transfer between the modules. The PTT interop module accommodates this delay.

Different Embodiments of the Push-to-Talk Interoperability Module

In the previous description, the PTT interop module is constructed as a separate logical module from the OMA-PoC TBCP module and the ISSI PTT control module. This construction has the advantage that the PTT interop module is decoupled from ISSI and OMS-PoC. Both ISSI and OMA-PoC are evolving protocols with new enhancements still being added. By decoupling the interop module from the two protocols, future changes in OMA-POC would only impact the OMA-PoC TBCP module. Similarly, changes in the ISSI protocol will only impact the ISSI PTT control module, if at all. However, this is not the only embodiment. For example, in one embodiment of the invention, the interop module can be logically integrated with the ISSI PTT control module (or integrated with the OMA-PoC TBCP module). Another embodiment is to have all three PTT related module be integrated into a single module. Other variation is also possible.

Distributive Implementation

In the above description, it is assumed that all messages between the modules are delivered in sequence and with no errors. This will normally be the case if all the modules reside in the same physical device. However, the embodiment also supports a distributive architecture, allowing all the modules to be housed in separate physical units. In this case, a technique would be preferable to ensure reliable and orderly delivery of the messages. One such mechanism is as follows.

Upon the receipt of a message, a response is sent back to the originator of the message to confirm the delivery of the message. The origination will wait for the above response after sending a message. While waiting for the response, it will resend a message every so often (determined by a timer) to ensure its delivery. If the response is received after N tries, the connection between the modules is considered down and alarm is sent to the network management system. Every message is attached with a sequence number (and/or timestamp) to protect against messages delivered out of order.

Home of the Group Resides in the P25 Network

Figure 17:
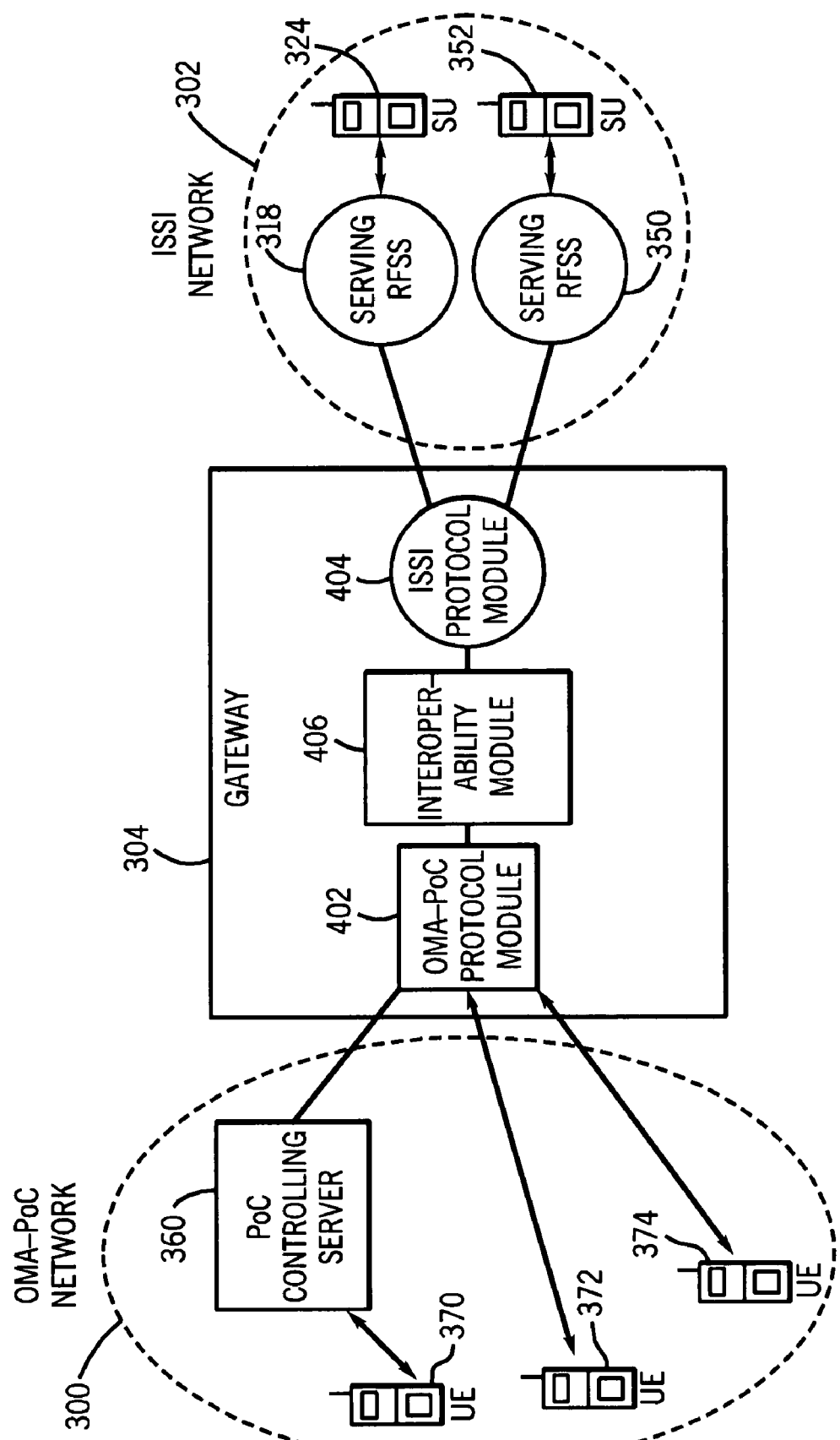
FIG. 17 shows an illustrative configuration with the home talk group in the commercial wireless network.

Referring to FIG. 17, the home of the talk group resides at PoC server 360 in the commercial wireless network 300. All the UEs 370, 372 and 374 in the commercial wireless network as well as GW 304 are connected to the server 360 through RTP. The OMA-PoC protocol module 402 in the GW functions as a UE when the talk group home resides in network 300. The GW is also connected to serving RFSSs 318 and 350 that support illustrative SUs 324 and 352. None of the RFSSs in network 302 serve as a home RFSS in this case. The ISSI protocol module 404 in the gateway functions as a home RFSS to the serving RFSSs in network 302.

The embodiment functions similarly to that described above where the home of the talk group was in the network 302, but with the roles of OMA-PoC module 402 and the ISSI protocol module 404 reversed. The direction of information flow is also reversed for the PTT interop module 406. In this case, the PoC server 360 determines the global winner and informs the GW of the decision. The ISSI PTT control module 404 acts as the home RFSS for this talk for the P25 network 302 and determines the local winner from the P25 network. In general, the same process logic applies.

Supporting a PTT Protocol Other than OMA-POC and ISSI

Although the illustrative embodiment is described as supporting PTT between OMA-PoC and ISSI, other PTT control protocols can be supported by substituting the OMA-PoC protocol module or the ISSI protocol module with the appropriate protocol module. In one situation, the protocols on both sides of the GW are the same protocol. In this case, the GW will use the same type protocol module for both networks and will function as a PTT arbitration concentrator in a hierarchical PTT network.

Hardware Structure

Figure 18:
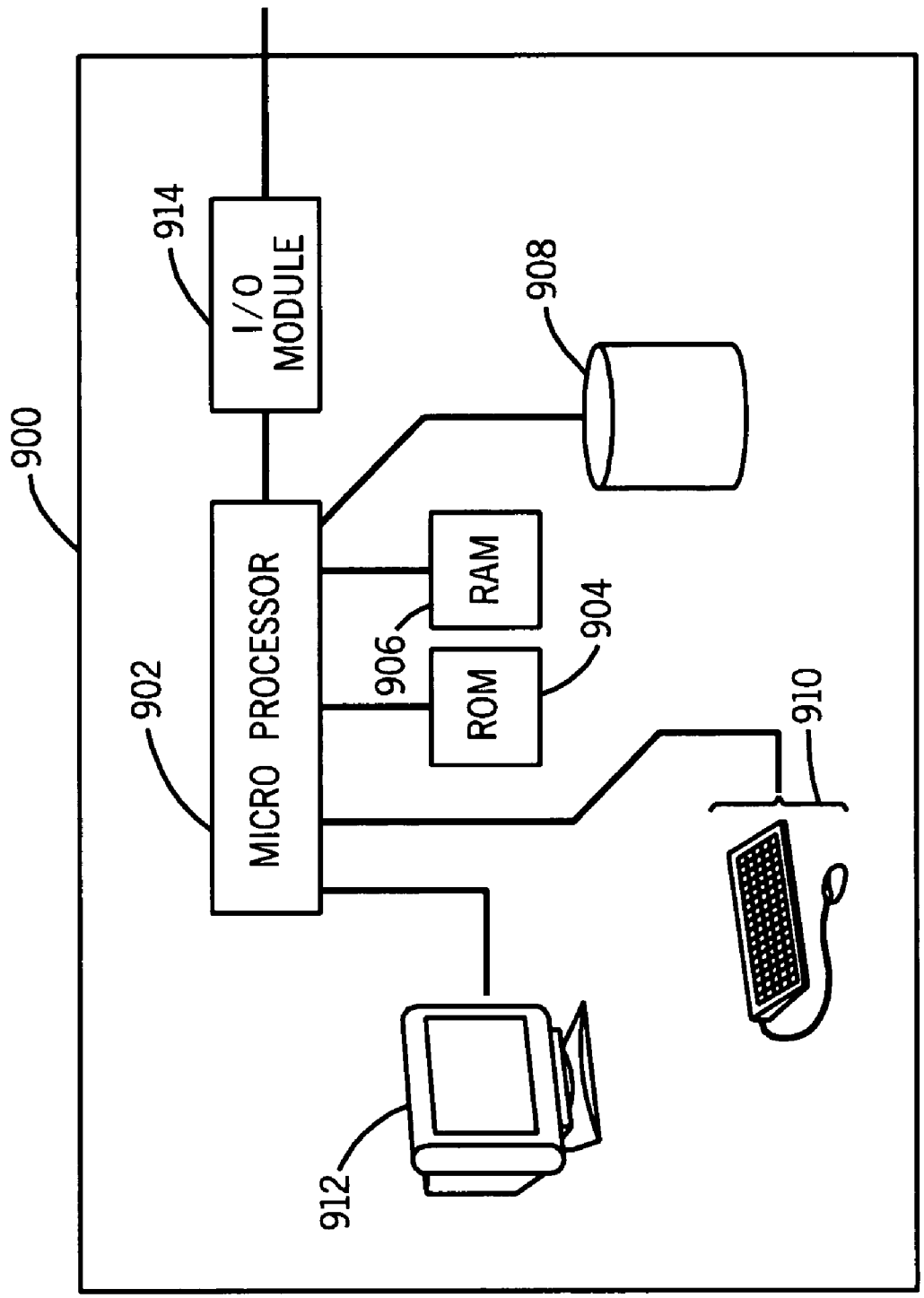
FIG. 18 is an illustrative architecture for implementing the modules/nodes.

FIG. 18 is a representative computing apparatus 900 that can serve as the hardware structure for each of the nodes/modules including the OMA-PoC module, Interop module and ISSI module of the gateway. It is also applicable as architecture for the servers in the networks. A microprocessor 902 performs processes and tasks based on stored program instructions. It is supported by read-only memory (ROM) 902, random access memory (RAM) 906 and nonvolatile data storage device 908. As will be understood by those skilled in the art, data and stored program instructions in ROM 902 is typically utilized by microprocessor 902 to initialize and boot the computing apparatus. An application program, e.g. a program that controls the implementation of one or more functions performed by the device, is stored in storage element 908. At least active portions of the application program will be typically stored in RAM 906 for ready access and processing by microprocessor 902. The application program will be specific to the functions to be performed by the device, and in the case of a module in the gateway, will perform the functions described. A variety of user inputs 910 such as a keyboard, keypad, and mouse can be utilized to control the operation of the device and applications running on it. A display screen 912 provides a visual output for an administrator of the device, e.g. characters and/or charts of operational parameters and related status of the device and functions. An input/output (I/O) module 914 provides a communication interface permitting microprocessor 902 to transmit and receive data with external nodes.

The modules in one example employs one or more computer readable signal bearing tangible media that stores software, firmware and/or assembly language for performing one or more portions of one or more embodiments of the invention. The computer-readable signal-bearing tangible media in one example comprises one or more of a magnetic, electrical, optical, biological, and atomic data storage medium. For example, the computer-readable signal-bearing media may comprise floppy disks, magnetic tapes, CD-ROMs, DVD-ROMs, hard disk drives, USB flash memory and electronic memory modules.

the steps, states, and operations described herein are only examples. There may be many variations to these without departing from the spirit of the invention. For instance, the steps/states may be performed in a differing order, or steps/states may be added, deleted, or modified. Although software is described in the illustrative example, the functions of the software may be incorporated as part of firmware, a logic array, or hardware based logic.

Each of these embodiments and obvious variations thereof are contemplated as falling within the spirit and scope of the claimed invention, which is set forth in the following claims.

We claim:

1. A method for providing push-to-talk (PTT) communications between users in first network with users in a second network where the first and second networks utilize different communication protocols, the method comprising the steps of:
   utilizing first and second protocol modules of a gateway to interface with the first and second networks, respectively, the first and second protocol modules capable of receiving and transmitting messages compatible with the communication protocols used by the respective first and second networks;
   converting, by the gateway, PTT control messages received from one of the first and second networks into PTT control messages compatible with and transmitted to the other of the first and second networks where the PTT control messages received from the one of the first and second networks have a protocol that differs from the protocol of the PTT control messages transmitted to the other of the first and second networks;
   determining at the gateway node which one of the first and second networks includes a home server hosting a PTT group call for each talk group, where the home server for a PTT group call can reside in either of the first and second networks;
   each of the first and second protocol modules having two selectable interface functions where one interface function supports communications when the associated network includes the home server and the other interface function supports communications when the associated network does not include the home server,
   selecting the one interface function for use by the first protocol module and the other interface function for use by the second protocol module based on the determining step determining that the home server is contained in the first network.

2. The method of claim 1 wherein the first protocol module provides a communication interface with an Open Mobile Alliance Push to Talk over Cellular standard and the second protocol module provides a communication interface with an Intra-RF Sub-Systems Interface standard.

3. The method of claim 2 wherein the first protocol module supports transmission of an audio stream from a user in the first network where the user is not a floor owner thereby providing a losing audio forwarding function.

4. The method of claim 2 wherein the first protocol module supports transmission of audio from a user in the first network where the user speaks before the user's handset receives a floor grant from a server thereby providing an early audio detection and forwarding function.

5. The method of claim 1 wherein the first protocol module provides a communication interface with an Open Mobile Alliance (OMA) Push to Talk over Cellular (PoC) standard and the second protocol module provides a communication interface with an Intra-RF Sub-Systems Interface standard, the first protocol module having selectable interfaces that function as a PoC controlling server and end user device, the second protocol module having selectable interfaces that function as a radio frequency sub-system (RFSS) home server and an RFSS serving server.

6. A method for providing push-to-talk (PTT) communications between users in first network with users in a second network where the first and second networks utilize different communication protocols, the method comprising the steps of:
    utilizing first and second protocol modules of a gateway to interface with the first and second networks, respectively, the first and second protocol modules capable of receiving and transmitting messages compatible with the communication protocols used by the respective first and second networks;
    converting, by the gateway, PTT control messages received from one of the first and second networks into PTT control messages compatible with and transmitted to the other of the first and second networks where the PTT control messages received from the one of the first and second networks have a protocol that differs from the protocol of the PTT control messages transmitted to the other of the first and second networks;
    wherein the first and second networks use different first and second audio codec conversion protocols, respectively, the method further comprising converting by the gateway audio information received with one of the first and second audio codec conversion protocols from a corresponding one of the first and second networks into audio information with the other of the first and second audio codec conversion protocols for transmitting the latter to the other of the first and second networks.

7. A method for providing push-to-talk (PTT) communications between users in first network with users in a second network where the first and second networks utilize different communication protocols, the method comprising the steps of:
    utilizing first and second protocol modules of a gateway to interface with the first and second networks, respectively, the first and second protocol modules capable of receiving and transmitting messages compatible with the communication protocols used by the respective first and second networks;
    converting, by the gateway, PIT control messages received from one of the first and second networks into PTT control messages compatible with and transmitted to the other of the first and second networks where the PTT control messages received from the one of the first and second networks have a protocol that differs from the protocol of the PTT control messages transmitted to the other of the first and second networks;
    wherein a predetermined call group includes members in the first and second networks, the method further comprising the first protocol module of the gateway functioning as a PTT server for the members in the first network and determining the identity of a first member in the first network that is a winner within the first network of the right transmit information to other members of a call group, the second protocol module of the gateway receiving from a global PTT server in the second network an identity of a second member in the second network that is a winner within the second network of the right transmit information to other members of the call group, determining by the gateway the one of the first and second members that will be a global winner giving the one member the current right to transmit information to all of the members of the call group in both the first and second networks.

8. A gateway apparatus that provides push-to-talk (PTT) communications between PTT users in first network with PTT users in a second network where the first and second networks utilize different PTT communication protocols, the gateway apparatus comprising:
    first and second protocol modules interface with the first and second PTT networks, respectively, the first and second protocol modules capable of receiving and transmitting messages compatible with the PTT communication protocols used by the respective first and second networks;
    an interoperability module, connected between the first and second modules, converts PTT control messages received from one of the first and second networks into PTT control messages compatible with and transmitted to the other of the first and second networks, where the PTT control messages received from the one of the first and second networks have a protocol that differs from the protocol of the PTT control messages transmitted to the other of the first and second networks;
    wherein a predetermined call group includes members in the first and second networks, the gateway apparatus wherein the first protocol module serves as a PTT server for the members in the first network and determinants the identity of a first member in the first network that is a winner within the first network of the right transmit information to other members of a call group, the second protocol module receiving from a global PTT server in the second network an identity of a second member in the second network that is a winner within the second network of the right transmit information to other members of the call group, further comprising means for determining the one of the first and second members that will be a global winner giving the one member the current right to transmit information to all of the members of the call group in both the first and second networks.

9. The gateway apparatus of claim 8 wherein the first protocol module provides a communication interface with an Open Mobile Alliance Push to Talk over Cellular standard and the second protocol module provides a communication interface with an Intra-RF Sub-Systems Interface standard.

10. The gateway apparatus of claim 9 wherein the first protocol module supports transmission of an audio stream from a user in the first network where the user is not a floor owner thereby providing a losing audio function.

11. The gateway apparatus of claim 9 wherein the first protocol module supports transmission of audio from a user in the first network where the user speaks before the user's handset receives a floor grant from a server thereby providing an early audio function.

12. A gateway apparatus that provides push-to-talk (PTT) communications between users in first network with users in a second network where the first and second networks utilize different communication protocols, the gateway apparatus comprising:
    first and second protocol modules interface with the first and second networks, respectively, the first and second protocol modules capable of receiving and transmitting messages compatible with the communication protocols used by the respective first and second networks;
    an interoperability module, connected between the first and second modules, converts PTT control messages received from one of the first and second networks into PTT control messages compatible with and transmitted to the other of the first and second networks, where the PTT control messages received from the one of the first and second networks have a protocol that differs from the protocol of the PTT control messages transmitted to the other of the first and second networks;

means for determining which one of the first and second networks includes a home server hosting a PTT group call, where the home server for a PTT group call can reside in either of the first and second networks;

each of the first and second protocol modules having two selectable interface functions where one interface function supports communications when the associated network includes the home server and the other interface function supports communications when the associated network does not include the home server;

means for selecting the one interface function for use by the first protocol module and the other interface function for use by the second protocol module based on the determination made by the determining means that the home server is contained in the first network.

13. The gateway apparatus of claim 12 wherein the first protocol module provides a communication interface with an Open Mobile Alliance (OMA) Push to Talk over Cellular (PoC) standard and the second protocol module provides a communication interface with an Intra-RF Sub-Systems Interface standard, the first protocol module having selectable interfaces that function as a PoC controlling server and end user device, the second protocol module having selectable interfaces that function as a radio frequency sub-system (RFSS) home server and an RFSS serving server.

14. A gateway apparatus that provides push-to-talk (PTT) communications between users in first network with users in a second network where the first and second networks utilize different communication protocols, the gateway apparatus comprising:

first and second protocol modules interface with the first and second networks, respectively, the first and second protocol modules capable of receiving and transmitting messages compatible with the communication protocols used by the respective first and second networks;

an interoperability module, connected between the first and second modules, converts PTT control messages received from one of the first and second networks into PTT control messages compatible with and transmitted to the other of the first and second networks, where the PTT control messages received, from the one of the first and second networks have a protocol that differs from the protocol of the PTT control messages transmitted to the other of the first and second networks;

wherein the first and second networks use different first and second audio codec conversion protocols, respectively, the gateway apparatus further comprising means for converting audio information received with one of the first and second audio codec conversion protocols from a corresponding one of the first and second networks into audio information with the other of the first and second audio codec conversion protocols before transmitting the latter to the other of the first and second networks.

* * * * *